United States Patent
Ao et al.

(10) Patent No.: US 10,079,629 B2
(45) Date of Patent: Sep. 18, 2018

(54) APPARATUS AND METHOD FOR PRE-CODING DATA BASED ON CHANNEL STATISTICS

(71) Applicant: Futurewei Technologies, Inc., Plano, TX (US)

(72) Inventors: Weng Chon Ao, Los Angeles, CA (US); Guosen Yue, Edison, NJ (US); Xiao-Feng Qi, Westfield, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/436,599

(22) Filed: Feb. 17, 2017

(65) Prior Publication Data

US 2018/0241444 A1 Aug. 23, 2018

(51) Int. Cl.
 *H04B 1/38* (2015.01)
 *H04B 7/0456* (2017.01)
 *H04L 5/00* (2006.01)
 *H04B 7/06* (2006.01)

(52) U.S. Cl.
 CPC ......... *H04B 7/0456* (2013.01); *H04B 7/0626* (2013.01); *H04L 5/0048* (2013.01)

(58) Field of Classification Search
 CPC .... H04B 7/0456; H04B 7/0626; H04L 5/0048
 USPC ....................................................... 375/219
 See application file for complete search history.

(56) References Cited

U.S. PATENT DOCUMENTS

| | | | | |
|---|---|---|---|---|
| 9,787,379 B2 * | 10/2017 | Onggosanusi | ....... | H04B 7/0456 |
| 2010/0255790 A1 * | 10/2010 | Farajidana | ........... | H04B 7/0695 |
| | | | | 455/69 |
| 2013/0028068 A1 * | 1/2013 | Park | ..................... | H04B 7/0478 |
| | | | | 370/203 |
| 2013/0294369 A1 * | 11/2013 | Dinan | ..................... | H04L 5/001 |
| | | | | 370/329 |
| 2014/0098689 A1 * | 4/2014 | Lee | ..................... | H04B 7/0469 |
| | | | | 370/252 |

(Continued)

FOREIGN PATENT DOCUMENTS

| | | |
|---|---|---|
| CN | 101388703 A | 3/2009 |
| CN | 102035625 A | 4/2011 |
| CN | 102420647 A | 4/2012 |

(Continued)

OTHER PUBLICATIONS

Wikipedia, "LTE (telecommunication)," Feb. 11, 2017, as retrieved by the Internet Archive Wayback Machine, https://web.archive.org/web/20170211062328/https://en.wikipedia.org/wiki/LTE_(telecommunication)/.

*Primary Examiner* — Helene Tayong

(74) *Attorney, Agent, or Firm* — FutureWei Technologies, Inc.

(57) ABSTRACT

Provided are an apparatus and method for pre-coding data based on quantized channel state information and channel statistics. In use, channel statistics are collected. Further, one or more reference signals are sent to a wireless device via at least one channel. Thereafter, quantized channel state information is received that corresponds to the at least one channel, where the quantized channel state information is sent by the wireless device based on the one or more reference signals. Data is pre-coded based on the quantized channel state information and the channel statistics. Further, the pre-coded data is transmitted to the wireless device.

15 Claims, 13 Drawing Sheets

(56) References Cited

U.S. PATENT DOCUMENTS

2015/0110036 A1* 4/2015 Zhang ................. H04W 72/085
                                                    370/329
2017/0279513 A1* 9/2017 Geirhofer ............ H04B 7/0626

FOREIGN PATENT DOCUMENTS

| CN | 106160810 A | 11/2016 |
|---|---|---|
| EP | 1821444 A2 | 8/2007 |

* cited by examiner

402 — GENERATE A PLURALITY OF CHANNEL REALIZATIONS BASED ON THE CHANNEL STATISTICS

404 — IDENTIFY, FOR EACH OF THE CHANNEL REALIZATIONS, A CHANNEL STATION INFORMATION INDEX

406 — DETERMINE A DECISION REGION FOR EACH OF A PLURALITY OF PRECODING VECTORS

408 — GENERATE THE CONDITIONAL CHANNEL COVARIANCE MATRIX FOR EACH DECISION REGION

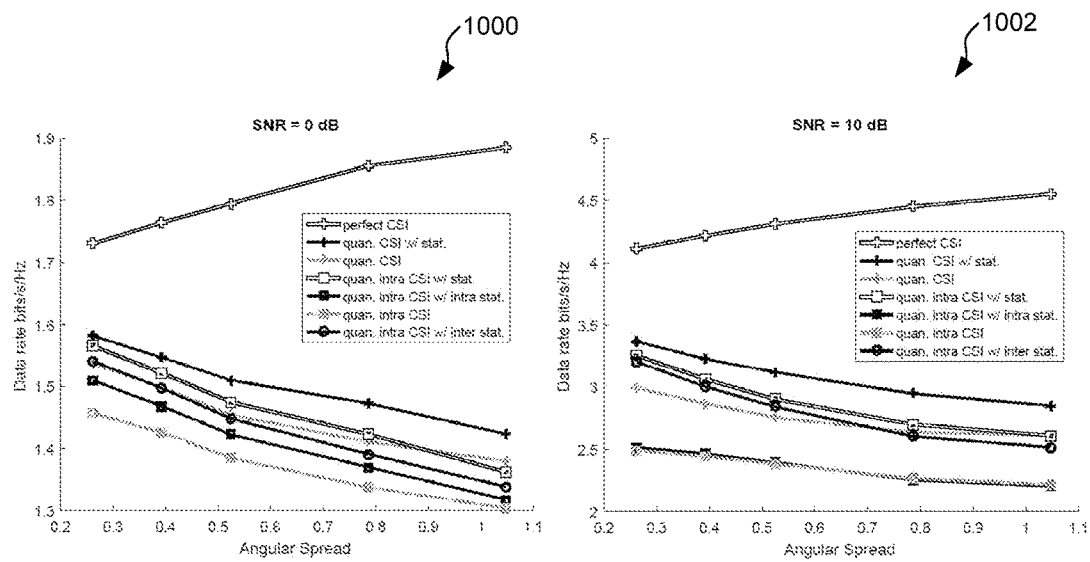
FIG. 10A
FIG. 10B
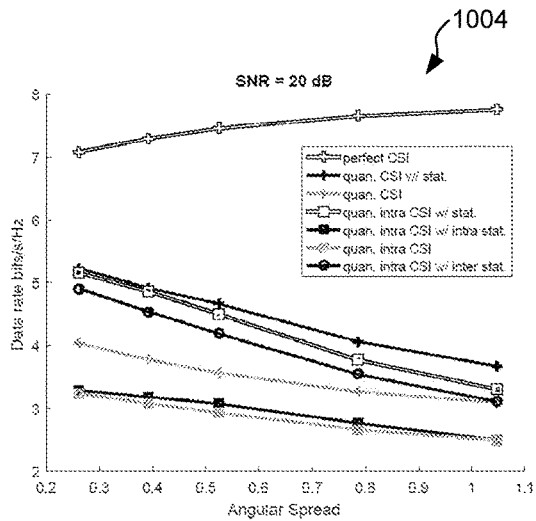
FIG. 10C

Single link. $M = 4$ antennas, $N = 2$ antennas, single layer.　Single link. $M = 4$ antennas, $N = 2$ antennas, single layer.

FIG. 13A　　　　FIG. 13B

Single link. $M = 4$ antennas, $N = 2$ antennas, single layer.

APPARATUS AND METHOD FOR PRE-CODING DATA BASED ON CHANNEL STATISTICS

FIELD OF THE INVENTION

The present invention relates to radio access technologies (RATs), and more particularly to pre-coding data for transmission over a network.

BACKGROUND

In the context of radio access technologies (RATs) and, in particular, those that implement multiple-input multiple-output (MIMO) antenna technologies, linear beamforming or pre-coding is prevalently employed to improve a received signal-to-noise ratio (SNR) and further suppress interference. In order to accomplish this, pre-coding requires knowledge of downlink channel state information (CSI) at the transmit side (e.g. at the base station). In some frequency division duplex (FDD) systems, such downlink CSI is obtained from a wireless device through uplink feedback.

In some FDD systems like those that implement long term evolution (LTE) standards-based protocols, an implicit quantized CSI feedback is used. However, use of such quantized CSI feedback is accompanied by channel quantization error. This error, in turn, results in performance degradation at the pre-coding stage, since, by virtue of the foregoing error, the CSI feedback does not accurately reflect channel conditions.

SUMMARY

An apparatus is provided for pre-coding data based on quantized channel state information and channel statistics. Included is a non-transitory memory storing instructions, at least one wireless transceiver, and one or more processors in communication with the non-transitory memory and the at least one wireless transceiver. The one or more processors execute the instructions to collect channel statistics. Further, one or more reference signals are sent to a wireless device via at least one channel. Thereafter, quantized channel state information is received that corresponds to the at least one channel, where the quantized channel state information is sent by the wireless device based on the one or more reference signals. Data is pre-coded based on the quantized channel state information and the channel statistics. Further, the pre-coded data is transmitted to the wireless device, utilizing the at least one wireless transceiver.

Also included is a method for pre-coding data based on quantized channel state information and channel statistics. In use, channel statistics are collected. Further, one or more reference signals are sent to a wireless device via at least one channel. Thereafter, quantized channel state information is received that corresponds to the at least one channel, where the quantized channel state information is sent by the wireless device based on the one or more reference signals. Data is pre-coded based on the quantized channel state information and the channel statistics. Further, the pre-coded data is transmitted to the wireless device.

Also included is a wireless device including a non-transitory memory storing instructions, at least one antenna, and one or more processors in communication with the non-transitory memory and the at least one antenna. The one or more processors execute the instructions to receive one or more reference signals via at least one channel, generate quantized channel state information corresponding to the at least one channel based on the one or more reference signals, send the quantized channel state information to a base station, and receive pre-coded data from the base station. The pre-coded data is based on the quantized channel state information and channel statistics.

In a first embodiment, the quantized channel state information may include an index $i^*$ that is calculated using the following equation:

$$i^* = \arg\max_{i\,:\,c_i \in C} |h^H c_i|$$

where $i$ is an index, $c_i$ is a component of a codebook $C$, $h$ is a complex column vector, and $^H$ denotes a Hermitian matrix.

In a second embodiment (which may or may not be combined with the first embodiment), a conditional channel covariance matrix may be generated, based on the quantized channel state information and the channel statistics. Further, the data may be pre-coded, utilizing the conditional channel covariance matrix.

In a third embodiment (which may or may not be combined with the first and/or second embodiments), a plurality of channel instances may be generated based on the channel statistics. Further, for each of the channel instances, quantized channel state information may be identified via an index from a codebook including a plurality of pre-coding vectors. Still yet, a decision region may be determined for each of the plurality of pre-coding vectors, utilizing the index. The conditional channel covariance matrix may be generated for each decision region.

In a fourth embodiment (which may or may not be combined with the first, second, and/or third embodiments), the decision region $A_i$, $i=1, \ldots, |C|$ may be determined using the following equation:

$$A_i \triangleq \{h \in \mathbb{C}^M : |h^H c_i| \geq |h^H c_j|, c_j \in C\}$$

where $c_i$ is a component of a codebook $C$, $\mathbb{C}^M$ is a complex vector of a size $M$, $h$ is a complex column vector, and $^H$ denotes a Hermitian matrix.

In a fifth embodiment (which may or may not be combined with the first, second, third, and/or fourth embodiments), the conditional channel covariance matrix may be generated using the following equation:

$$\mathbb{E}[hh^h \mid h \in A_{i^*}] \approx \frac{1}{|A_i|} \sum_{h_n \in A_i} h_n h_n^H$$

In a sixth embodiment (which may or may not be combined with the first, second, third, fourth, and/or fifth embodiments), the pre-coding may include setting a pre-coding vector to an eigenvector corresponding to a largest eigenvalue of the conditional channel covariance matrix.

In a seventh embodiment (which may or may not be combined with the first, second, third, fourth, fifth, and/or sixth embodiments), the aforementioned apparatus may include a first base station, and the channel statistics may include inter-cell channel statistics involving the first base station and a second base station.

In an eighth embodiment (which may or may not be combined with the first, second, third, fourth, fifth, sixth, and/or seventh embodiments), the aforementioned apparatus may include a first base station and the quantized channel state information may include inter-cell quantized channel state information involving the first base station and a second base station.

To this end, in some optional embodiments, one or more of the foregoing features of the aforementioned apparatus and/or method may compensate for any ramifications of quantization error that results from pre-coding data based solely on quantized channel state information. Such compensation may, in turn, result in increased gain that would otherwise be foregone in systems that lack such capability. It should be noted that the aforementioned potential advantages are set forth for illustrative purposes only and should not be construed as limiting in any manner.

BRIEF DESCRIPTION OF THE DRAWINGS

FIG. 10A illustrates a plot showing data rates as a function of angular speed for different pre-coding based on perfect/quantized CSI, for comparison with a multi-link embodiment (with a BS having M=4 antennas) employing pre-coding based on channel statistics in addition to quantized CSI, where such multi-link embodiment is for SNR=0 dB.

FIG. 10B illustrates a plot showing data rates as a function of angular speed for different pre-coding based on perfect/quantized CSI, for comparison with a multi-link embodiment (with a BS having M=4 antennas) employing pre-coding based on channel statistics in addition to quantized CSI, where such multi-link embodiment is for SNR=10 dB.

FIG. 10C illustrates a plot showing data rates as a function of angular speed for different pre-coding based on perfect/quantized CSI, for comparison with a multi-link embodiment (with a BS having M=4 antennas) employing pre-coding based on channel statistics in addition to quantized CSI, where such multi-link embodiment is for SNR=20 dB.

FIG. 13A illustrates a plot showing data rates as a function of angular speed for different pre-coding based on perfect/quantized CSI, for comparison with a single link embodiment (with a BS having M=4 antennas, the user equipment (UE) having N=2 antennas, and single layer receiver combining) employing pre-coding based on channel statistics in addition to quantized CSI, where such single link embodiment is for SNR=0 dB.

FIG. 13B illustrates a plot showing data rates as a function of angular speed for different pre-coding based on perfect/quantized CSI, for comparison with a single link embodiment (with a BS having M=4 antennas, the UE having N=2 antennas, and single layer receiver combining) employing pre-coding based on channel statistics in addition to quantized CSI, where such single link embodiment is for SNR=10 dB.

DETAILED DESCRIPTION

Figure 1:
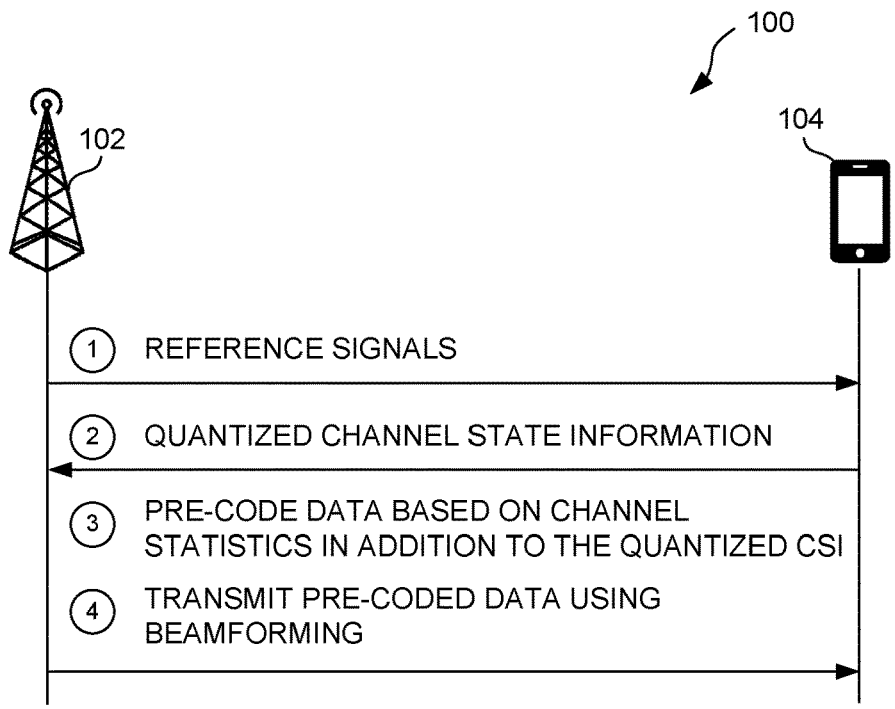
FIG. 1 illustrates a system for pre-coding data based on channel statistics in addition to quantized channel state information (CSI), in accordance with an embodiment.

FIG. 1 illustrates a system 100 for pre-coding data based on channel statistics in addition to quantized channel state information (CSI), in accordance with an embodiment. As shown, at least one base station 102 is provided. Non-limiting examples of the foregoing base station 102 may include a Node B, multi-standard radio (MSR) radio node such as an MSR base station (BS), evolved universal mobile telecommunications service (UMTS) terrestrial radio access network (E-UTRAN) Node (eNode) B (enB), network controller, radio network controller (RNC), BS controller (BSC), relay, donor node controlling relay, base transceiver station (BTS), access point (AP), transmission point, transmission nodes, remote radio unit (RRU), remote radio head (RRH), node in a distributed antenna system (DAS), a cell node, and/or any other apparatus that is configured for communicating with a wireless communication device 104 over the telecommunication network (not shown). Further, the wireless communication device 104 (or simply "wireless device") may, in various embodiments, include a phone, a tablet, a laptop, a vehicle, any desired type of user equipment (UE), and/or any other type of device capable of communicating on the aforementioned telecommunication network or any other type of network, for that matter.

In use, one or more reference signals are sent to the wireless device 104 via at least one channel, as indicated in operation 1. For example, in various embodiments, such reference signal(s) may include a pilot signal, synchronization signal, etc. Thereafter, in operation 2, the quantized CSI is received that corresponds to the at least one channel. The quantized CSI is sent by the wireless device 104 based on the one or more reference signals.

As indicated in operation 3, data is pre-coded by the base station 102 based on channel statistics, in addition to the quantized CSI. In the context of the present description, channel statistics may refer to any statistics associated with at least one channel. Non-limiting examples of such channel statistics may involve a mean, covariance, and/or any other statistic capable of being measured, calculated, and/or estimated in connection with an operation of the at least one channel. Further non-exhaustive examples of channel statistics include a long term average signal-to-noise ratio (SNR) and a power angle profile (PAP). Still yet, for long term evolution (LTE) standards-based systems, the channel statistics may include reference signal receive power (RSRP) and reference signal receive quality (RSRQ) signaling-related statistics.

Further, as will become apparent later, the collection of such channel statistics may involve the collection of statistics and/or any underlying data (on which the statistics are based) and may further be collected from any source in connection with any channel. Still yet, while not shown, it should be noted that such channel statistics may be collected at any time. For example, while operation 3 is shown to follow operation 2, it should be strongly noted that such statistics collection may occur at any time including, but not limited to before or after operation 1 and/or 2.

Also in the context of the present description, the aforementioned pre-coding of operation 3 may include any processing of data that occurs before transmission of the data for employing multiple antennas of the base station 102 for enhancing transmission capabilities. For example, in one possible embodiment, the aforementioned multiple antennas may be configured as multiple-input multiple-output (MIMO) antennas that are capable of beamforming.

By this design, the pre-coded data is transmitted from the base station 102 to the wireless device 104 using beamforming in operation 4. Further, by pre-coding the data based the channel statistics, in addition to the quantized CSI, any quantization error that is introduced may be compensated for, thus ensuring optimal transmission performance. More illustrative information will now be set forth regarding various optional architectures and uses in which the foregoing method may or may not be implemented, per the desires of the user. Specifically, for example, more information regarding the various operations 1-4 of the system 100 of FIG. 1 will now be set forth during the description of different embodiments shown in FIG. 2A-2B. It should be noted that the following information is set forth for illustrative purposes and should not be construed as limiting in any manner. Any of the following features may be optionally incorporated with or without the other features described.

Figure 2A:
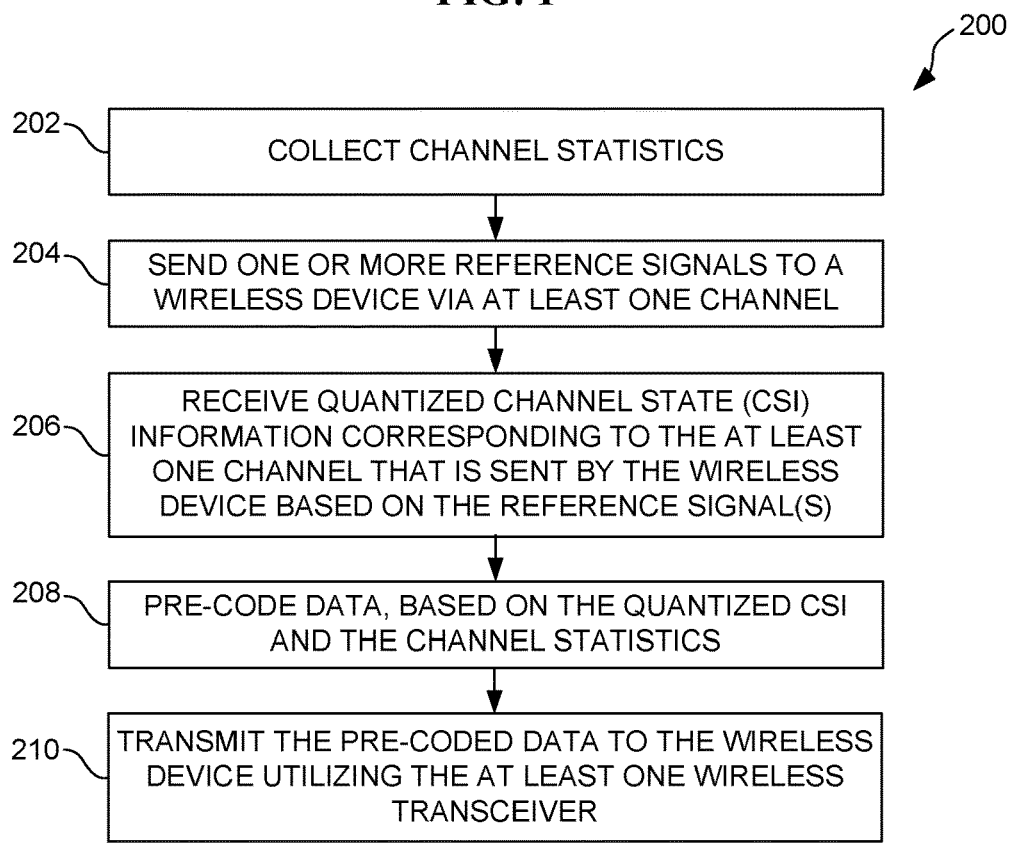
FIG. 2A illustrates a flow chart of a method for pre-coding data based on channel statistics in addition to CSI, in accordance with another embodiment.

FIG. 2A illustrates a flow chart of a method 200 for pre-coding data based on channel statistics in addition to quantized CSI, in accordance with another embodiment. As an option, the method 200 may be implemented in the context of any one or more of the embodiments set forth in any previous and/or subsequent figure(s) and/or description thereof. For example, the method 200 may be implemented in the context of the base station 102 of the system 100 of FIG. 1. However, it is to be appreciated that the method 200 may be implemented in the context of any desired environment.

As shown in operation 202, channel statistics are collected. As mentioned earlier, in various different embodiments, such channel statistics may include a mean, covariance, and/or any other statistic involving operation of at least one channel. Further, such channel statistics may be measured, calculated, and/or estimated in connection with a distribution (e.g. Gaussian distribution, etc.) with which the channel operation is modeled. Specifically, a distribution may be compiled based on specific data points reflecting the channel operation, and then the aforementioned channel statistics may be generated therefrom.

In various embodiments, the foregoing channel statistics may be collected by a base station (e.g. the base station 104 of FIG. 1, etc.). For example, in one embodiment, the channel statistics may be collected by being received by the base station from another node (e.g. one or more other base stations, one or more wireless devices, etc.) where such other node may or may not collect the underlying data used as a basis for the channel statistics. In another possible embodiment, the channel statistics may be collected by receiving underlying data from another node (e.g. one or more other base stations, one or more wireless devices, etc.) where the base station calculates the foregoing channel statistics from the received underlying data. Still yet, in another possible embodiment, the channel statistics may be collected independent of any other node where the base station both collects the underlying data, and also calculates the foregoing channel statistics based on such underlying data.

In various embodiments, each data point of the aforementioned underlying data may include various measurements including, but not limited to measurements in connection with an uplink channel from another node to an underlying base station, or a downlink channel measured at the node and fed back from the node to the underlying base station. Further, while the method 200 is shown to start with the channel statistics collection of operation 102, it should be noted that such operation 102 may occur before and/or after any of the subsequent operations to be described.

Still yet, as mentioned earlier, the channel statistics may be collected for any channel. For example, in one possible embodiment, the channel statistics may be collected for another channel that is not to be the subject of the pre-coding of the method 200 of FIG. 2A. Specifically, in such embodiment, the channel statistics may be collected in connection with an uplink channel, and used in connection with the pre-coding for a downlink channel. Specifically, the aforementioned channel statistics for the uplink channel may be assumed to be an estimation of channel statistics for the downlink channel (in view of reciprocity therebetween, possibly with a certain transformation or adjustment based on an uplink/downlink carrier frequency difference). Further, such estimated channel statistics may be utilized in connection with the pre-coding of the data, for transmission via the downlink channel, in a manner that will soon be set forth. In still other embodiments, the channel statistics may be directly collected for the downlink channel.

With continuing reference to FIG. 2A and, in particular, operation 204, one or more reference signals are sent to a wireless device (e.g. the wireless device 104 of FIG. 1) via at least one channel. In the context of the present description, such reference signal(s) may refer to any signaling that may be used to calculate the quantized CSI. For example, in various embodiments, such reference signal(s) may include a pilot signal, synchronization signal, etc. In one embodiment involving a network operating in accordance with a long term evolution (LTE) protocol or advanced permutation thereof (e.g. LTE-Advanced, etc.), the reference signal may exist only at a physical layer and not deliver any specific information, but merely serve as a reference point for the wireless device to measure a downlink power administered by the base station. As an option, the reference signal(s) may be implemented using multiple specific resource elements at certain slots and/or location that are specifically determined based on an antenna configuration.

Thereafter, in operation 206, quantized CSI is received that corresponds to the at least one channel over which the reference signal(s) was sent. In the context of the present description, the CSI may refer to any information that reflects a state of the at least one channel and is based on the reference signal(s). Further, quantized CSI refers to any CSI that includes any error that results from quantization. In various embodiments, the foregoing quantization error may be a result of, among other things, a difference between an input value and a corresponding quantized value (e.g. round-off, truncated, etc. value, etc.).

In different embodiments, the foregoing channel state may reflect a power of the reference signal(s), any interference in connection with the reference signal(s) (e.g. SNR), etc. In use, such quantized CSI may be generated, selected, compiled, estimated, or otherwise provided, and thereafter sent by the wireless device based on the reference signal(s). Further, the quantized CSI may be associated with a wideband or be provided for each sub-based on the channel(s), and may be communicated with or without scheduling over any desired channel [e.g. physical uplink control channel (PUCCH), etc.] on a periodic or an aperiodic basis (e.g. upon request, etc.).

In one particular possible embodiment involving a network operating in accordance with a LTE protocol or advanced permutation thereof, the quantized CSI may possibly include one or more of: a rank indicator or index (RI), a pre-coding matrix index (PMI), and/or a channel quality indicator (CQI). RI may include an indicator indicating how well multiple antennas work. Further, the PMI includes an index that may be used to identify weights that are best suited for use during pre-coding when transmitting data over a particular channel. Still yet, in various embodiments, the CQI may be based on the RI and/or PMI and indicate a type of modulation scheme that should be used based on a current channel quality. For example, a higher CQI value (e.g. 0 to 15) may cause a higher modulation scheme [e.g. quadrature phase shift keying (QPSK), 64-quadrature amplitude modulation (QAM)] and a higher coding rate to be used by an eNB to achieve higher efficiency.

In operation 208, data is pre-coded based on the quantized CSI and the channel statistics. In the context of the present embodiment, the foregoing pre-coding may involve any coding algorithm that is at least partially a function of both the quantized CSI and the channel statistics. For example, in one possible embodiment that will be described during reference to FIG. 2B, the pre-coding may utilize a conditional covariance matrix that is generated based on the channel statistics. With that said, other embodiments are contemplated where use of such conditional covariance matrix may be omitted in favor of more directly utilizing the channel statistics during pre-coding (e.g. without intermediate calculations such as the aforementioned conditional covariance matrix calculation, etc.).

Further, in operation 210, the pre-coded data is transmitted to the wireless device, utilizing at least one wireless transceiver. By utilizing the channel statistics in connection with the pre-coding in the foregoing manner, at least partial compensation is provided for any quantization error introduced when the foregoing pre-coding is carried out without the channel statistics. To this end, by pre-coding data in a manner that takes the channel statistics into account, a signal gain may be increased or, in some embodiments, even maximized.

Figure 2B:
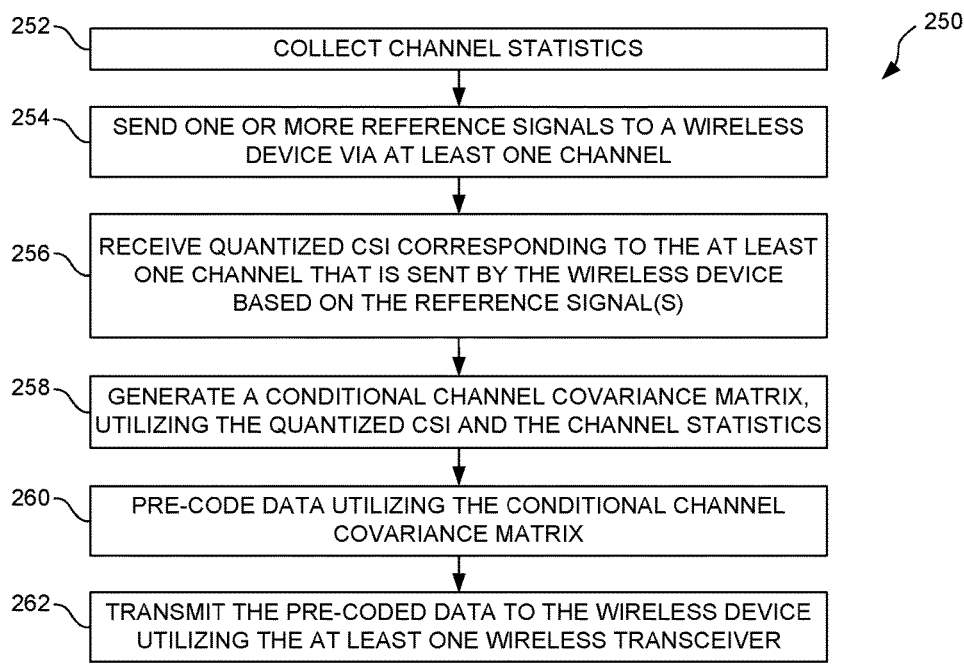
FIG. 2B illustrates a flow chart of a method for pre-coding data based on channel statistics in addition to CSI by utilizing a conditional covariance matrix, in accordance with another embodiment.

FIG. 2B illustrates a flow chart of a method 250 for pre-coding data based on channel statistics in addition to quantized CSI by utilizing a conditional covariance matrix, in accordance with another embodiment. As an option, the method 250 may be implemented in the context of any one or more of the embodiments set forth in any previous and/or subsequent figure(s) and/or description thereof. For example, the method 250 may be implemented in the context of the base station 102 of the system 100 of FIG. 1. However, it is to be appreciated that the method 250 may be implemented in the context of any desired environment.

Similar to operations 202-206 of the method 200 of FIG. 2A, the present method 250, in operation 252, collects channel statistics, and sends, in operation 254, one or more reference signals to a wireless device, so that a quantized CSI may be received, in operation 256.

In contrast to the method 200 of FIG. 2A, the present method 250, in operation 258, generates a conditional channel covariance matrix, based on the quantized CSI and the channel statistics. In the context of the present description, such conditional channel covariance matrix may include any channel covariance matrix that is conditional in nature insofar that it is specifically derived from only a subset of the overall underlying channel data set where the subset of channel data is determined based on CSI feedback which includes quantized channel information. Specific examples of such conditional channel covariance matrix will be described in the context of different embodiments set forth in subsequent figures and, in particular, Equation 8.

With continuing reference to FIG. 2B, the data is pre-coded utilizing the conditional channel covariance matrix in operation 260 before being transmitted in operation 262. The pre-coding of operation 260 may, in one possible embodiment, include setting a pre-coding vector to an eigenvector corresponding to a largest eigenvalue of the conditional channel covariance matrix. By utilizing the channel statistics in connection with the pre-coding in the foregoing manner, at least partial compensation is provided for any quantization error introduced when the foregoing pre-coding is carried out without the channel statistics. To this end, by pre-coding data in a manner that takes the channel statistics (e.g. conditional channel covariance matrix, etc.) into account, a signal gain may be increased or, in some embodiments, even maximized. More information will now be set forth regarding a different embodiment shown in FIGS. 3A/3B, that involves a specific technique for pre-coding data, utilizing the conditional channel covariance matrix.

Specifically, more information will now be set forth regarding a particular embodiment where channel statistics are utilized (in connection with pre-coding) in a single link-equipped UE environment operating in an LTE network. In such environment, there is one BS and one UE, and the BS is equipped with multiple M antennas while the UE is equipped with one N=1 antenna. In the context of the present embodiment, the channel between the BS and the UE may be denoted as a complex column vector h of dimension M×1, (i.e., $h \in \mathbb{C}^M$). The received signal at the UE is thereby given in Equation 1 below. It should be noted that, for subsequent equations, definitions will only be provided for expressions, variables, constants, coefficients, etc. that have not already been defined prior.

$$y = h^H w \mathbb{C} + \mathbb{C}, \qquad \text{Equation 1}$$

where y is the received signal, h is the complex column vector, w is the linear pre-coding vector, x is the transmit data symbol, n is additive white noise, and $(\cdot)^H$ denotes a Hermitian matrix. A unit-norm pre-coding vector w may thus be obtained such that the signal gain $|h^H w|^2$ is maximized.

Given that the UE uses a LTE codebook $C=\{c_1, c_{|C|}\}$ for the aforementioned quantized CSI feedback, the UE feedbacks the index set forth in Equation 2.

$$i^* = \arg \max_{i : c_i \in C} |h^H c_i| \qquad \text{Equation 2}$$

where i is the index, and $c_i$ is a component of the LTE codebook.

In addition, a decision region $A_i$, i=1, ..., |C| is defined in Equation 3.

$$A_i \triangleq \{h \in \mathbb{C}^M : |h^H c_i| \geq |h^H c_j|, c_j \in C\} \qquad \text{Equation 3}$$

where any channel vector belonging to $A_i$ is quantized to the codeword $c_i$, $\mathbb{C}^M$ is a complex vector of size M (which has been specified hereinabove), h & H have been specified hereinabove, and $c_j$ and C are the codebook entry and codebook, respectively (as specified hereinabove).

For comparison purposes, multiple scenarios will be described, namely a first scenario with perfect CSI and a second scenario with the quantized CSI, where the first/second scenario are provided for comparison with a particular embodiment that employs channel statistics in addition to the aforementioned quantized CSI.

Regarding the first scenario, the BS uses a pre-coding vector $$w = \frac{h}{\|h\|}.$$

Further, the resulting average data rate is denoted as $R^{CSI}$, which can be computed in Equation 4.

$$R^{CSI} = \mathbb{E}\left[\log\left(1 + \frac{P\|h\|^2}{\sigma^2}\right)\right] \qquad \text{Equation 4}$$

where P is a transmit power and $\sigma^2$ is a noise power.

Regarding the second scenario based on the quantized feedback, the BS uses the pre-coding vector $w=c_{i^*}$. The resulting average data rate is denoted as $R^{quan.CSI}$ which can be computed per Equation 5.

$$R^{quan.CSI} = \mathbb{E}\left[\log\left(1 + \frac{P|h^H c_{i^*}|^2}{\sigma^2}\right)\right] \qquad \text{Equation 5}$$

Turning now to the present embodiment, when both the statistics of h and the quantized CSI feedback are available at the BS for pre-coding, the BS uses the pre-coding vector $w=u^*$ which is defined by Equation 6.

$$u^* = \arg \max_{u : \|u\|=1} u^H \mathbb{E}[hh^H | h \in A_{i^*}] u \qquad \text{Equation 6}$$

In other words, $u^*$ is a eigenvector corresponding to a largest eigenvalue of the conditional channel covariance matrix $\mathbb{C}[hh^H|h \in A_{i^*}]$. Further, u is a precoding vector variable to be designed as in the cost function in Equation 6, and $u^*$ is the result that maximizes the cost function in Equation 6. The resulting average data rate is denoted as $R^{quan.CSI\ w/stat}$, which can be computed per Equation 7.

$$R^{quan-CSI w/stat} = \mathbb{E}\left[\log\left(1 + \frac{P|h^H u^*|^2}{\sigma^2}\right)\right] \qquad \text{Equation 7}$$

Figure 3A:
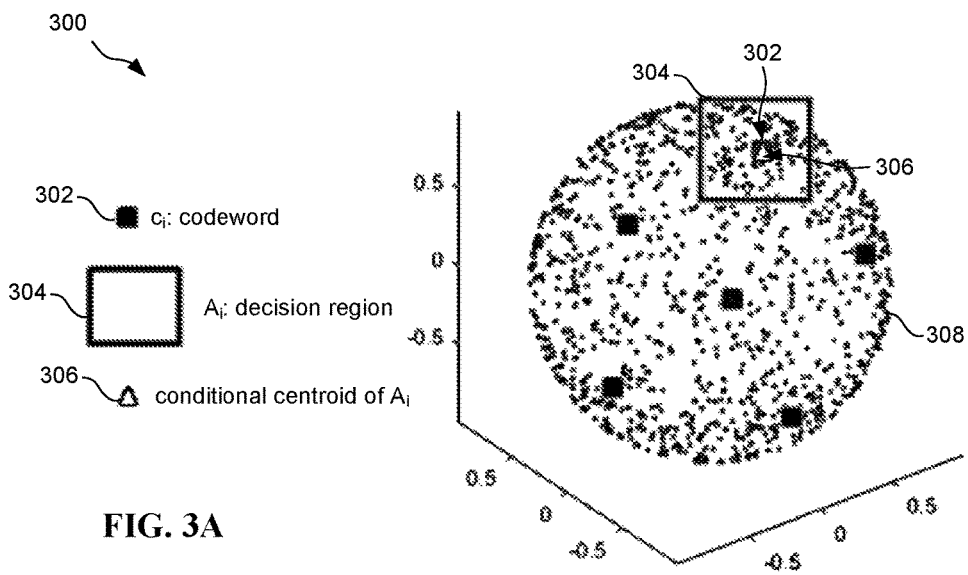
FIGS. 3A and 3B are pictorial illustrations showing beamforming based on channel statistics and quantized CSIs, in accordance with an embodiment.
Figure 3B:
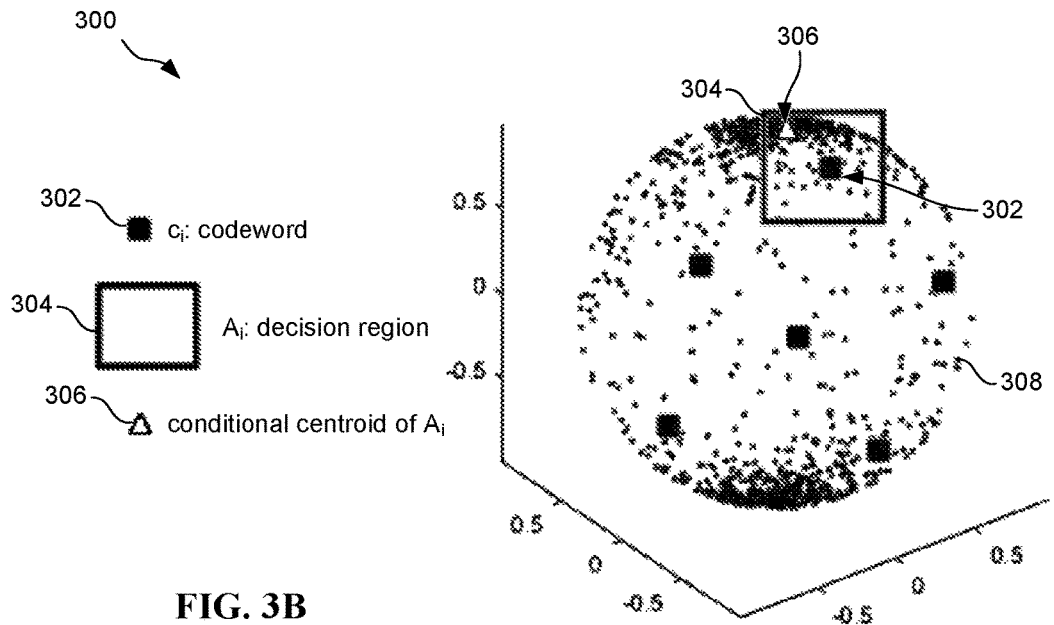

FIGS. 3A and 3B are pictorial illustrations 300 showing beamforming based on channel statistics and quantized CSIs, in accordance with an embodiment. As shown, a fixed codebook is provided where codewords 302 (shown as solid squares) are situated in an ordinary two-dimensional sphere in three-dimensional Euclidean space. A boundary of one of the aforementioned decision regions $A_i$ 304 (shown as a hollow square) for the codeword $c_i$ is also shown to be projected onto the two-dimensional sphere (centered at a corresponding codeword $c_i$). Realizations of a jointly Gaussian channel vector $h=[h_1 h_2 h_3]^T \in \mathbb{R}^3$ 308 (shown as small dots) are also projected onto the two-dimensional sphere.

As shown, when the channel coefficients $h_1$, $h_2$, and $h_3$ are uncorrelated, as shown in FIG. 3A, the codeword $c_i$ 302 provides a good quantization. However, when the channel coefficients are correlated, as shown in FIG. 3B, the conditional mean of $$\frac{h}{\|h\|}$$

in $A_i$ 306 (shown as a triangle) provides a better quantization than the codeword $c_i$ itself.

In the context of the above analysis, the quantity of interest is related to the conditional covariance matrix, instead of the conditional mean, since the data rate is directly related to the signal power. Given the codebook and the channel statistics of the UE, the conditional covariance matrix $E[hh^H|h \in A_{i^*}]$ may be obtained via the Monte Carlo method for each codeword in the codebook, in a manner that will now be described.

Figure 4:
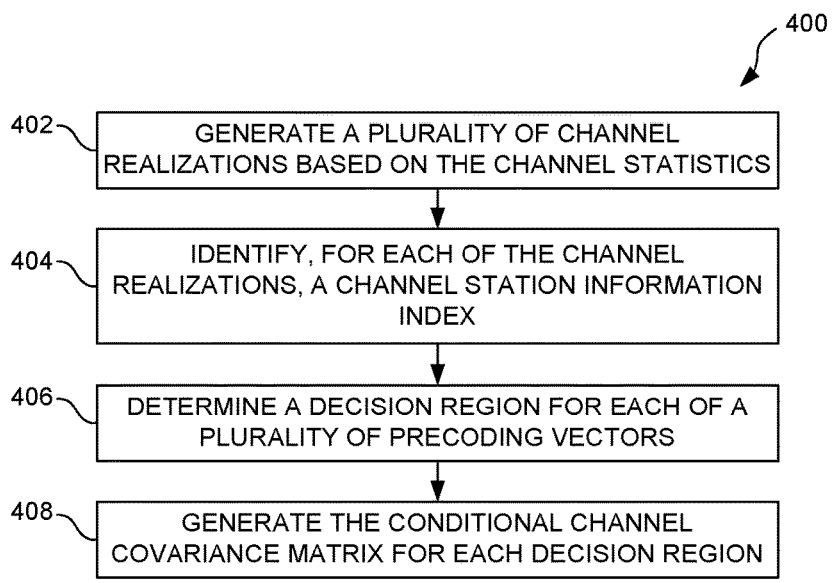
FIG. 4 illustrates a flow chart of a method for generating a conditional covariance matrix for use in pre-coding data prior to transmission, in accordance with another embodiment.

FIG. 4 illustrates a flow chart of a method 400 for generating a conditional covariance matrix for use in pre-coding data prior to transmission, in accordance with another embodiment. As an option, the method 400 may be implemented in the context of any one or more of the embodiments set forth in any previous and/or subsequent figure(s) and/or description thereof. For example, the method 400 may be implemented in the context of the base station 102 of the system 100 of FIG. 1 and further in the context of operation 258 of FIG. 2B. However, it is to be appreciated that the method 400 may be implemented in the context of any desired environment.

As shown in operation 402, a plurality of channel instances (e.g. channel realizations, or samples, etc.) $h_n$, n=1, ..., $N_{samples}$, are generated based on the channel statistics. Further, in operation 404, for each of the channel instances $h_n$, quantized channel state information is identified via a CSI index from a codebook including a plurality of pre-coding vectors. In one embodiment, operation 404 may be carried out utilizing Equation 2 set forth earlier.

Still yet, in operation 406, a decision region (e.g. decision regions 304 of FIGS. 3A-3B) is determined for each of the plurality of pre-coding vectors, utilizing the CSI index. In one embodiment, operation 406 may be carried out utilizing Equation 3 set forth earlier.

Next, in operation 408, the conditional channel covariance matrix is generated for each decision region. In one embodiment, operation 408 may be carried out utilizing Equation 8.

$$\mathbb{E}[hh^h \mid h \in A_{i^*}] \approx \frac{1}{|A_i|} \sum_{h_n \in A_i} h_n h_n^H. \qquad \text{Equation 8}$$

Since the codebook is fixed per the relevant protocol specification and the statistical channel changes much slower, the above technique affords useful estimations for the conditional channel covariance.

Figure 5A:
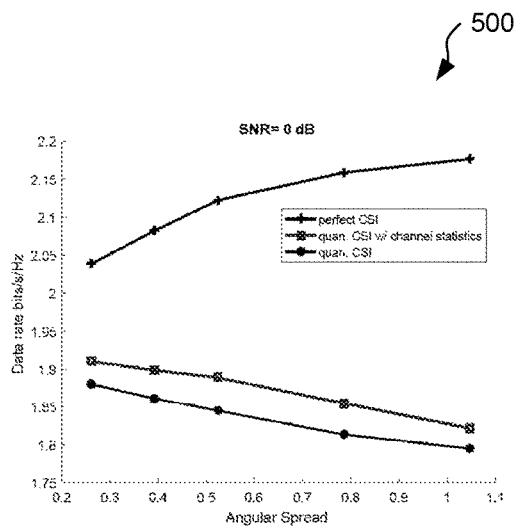
FIG. 5A illustrates a plot showing data rates as a function of angular speed for different pre-coding based on perfect/quantized CSI, for comparison with a single link embodiment (with a base station (BS) having M=4 antennas) employing pre-coding based on channel statistics in addition to quantized CSI, where such single link embodiment is for SNR=0 dB.
Figure 5B:
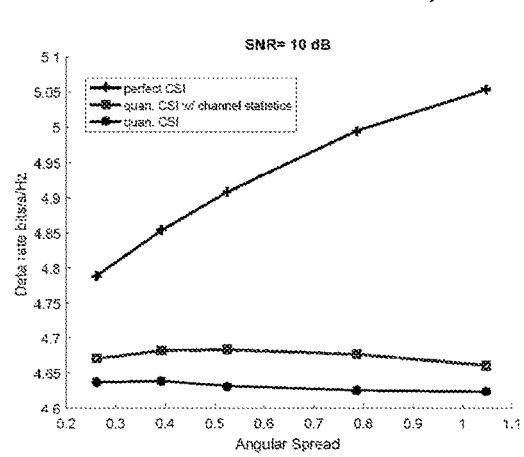
FIG. 5B illustrates a plot showing data rates as a function of angular speed for different pre-coding based on perfect/quantized CSI, for comparison with a single link embodiment (with a BS having M=4 antennas) employing pre-coding based on channel statistics in addition to quantized CSI, where such single link embodiment is for SNR=10 dB.
Figure 5C:
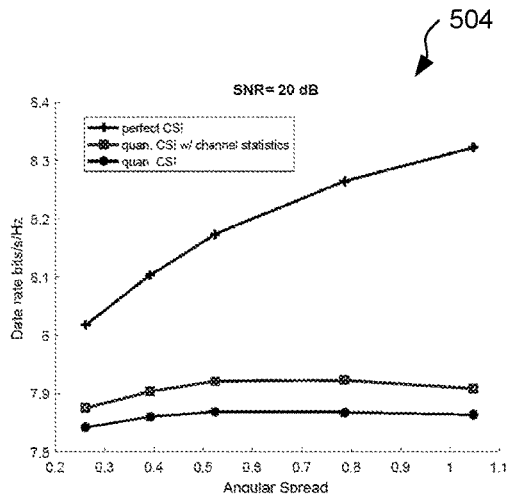
FIG. 5C illustrates a plot showing data rates as a function of angular speed for different pre-coding based on perfect/quantized CSI, for comparison with a single link embodiment (with a BS having M=4 antennas) employing pre-coding based on channel statistics in addition to quantized CSI, where such single link embodiment is for SNR=20 dB.

FIGS. 5A, 5B and 5C illustrate plots showing data rates as a function of angular speed for different pre-coding based on a perfect/quantized CSI, for comparison with single link embodiments (with a BS having M=4 antennas) employing pre-coding based on channel statistics in addition to quantized CSI, where such embodiments vary based on different signal to noise ratios (SNRs). Specifically, FIG. 5A illustrates a plot 500 showing data rates as a function of angular speed for different pre-coding based on perfect/quantized CSI, for comparison with a single link embodiment (with a BS having M=4 antennas) employing pre-coding based on channel statistics in addition to quantized CSI, where such single link embodiment is for SNR=0 dB. Further, FIG. 5B illustrates a plot 502 showing data rates as a function of angular speed for different pre-coding based on perfect/quantized CSI, for comparison with a single link embodiment (with a BS having M=4 antennas) employing pre-coding based on channel statistics in addition to quantized CSI, where such single link embodiment is for SNR=10 dB. Still yet, FIG. 5C illustrates a plot 504 showing data rates as a function of angular speed for different pre-coding based on perfect/quantized CSI, for comparison with a single link embodiment (with a BS having M=4 antennas) employing pre-coding based on channel statistics in addition to quantized CSI, where such single link embodiment is for SNR=20 dB.

For FIGS. 5A, 5B, and 5C, a BS is assumed to be equipped with M=4 antennas servicing a UE with N=1 antenna. The channel h is generated by using a one-ring scattering model with different values of the angular spread. Further, an LTE Rel-8 4Tx codebook is employed with a total of 16 codewords. As shown, the achieved data rates are compared in the following three scenarios: a perfect CSI scenario where the BS has a perfect CSI, a quantized CSI scenario where the BS has a quantized CSI, and a quantized CSI with channel statistics scenario, in accordance with the current embodiment, where the BS uses both the quantized CSI and the channel statistics in connection with pre-coding. Further, the data rate is plotted with respect to the angular spread under three different SNR values. As illustrated, a knowledge of the channel statistics information is beneficial to system performance for all SNR cases.

Figure 6A:
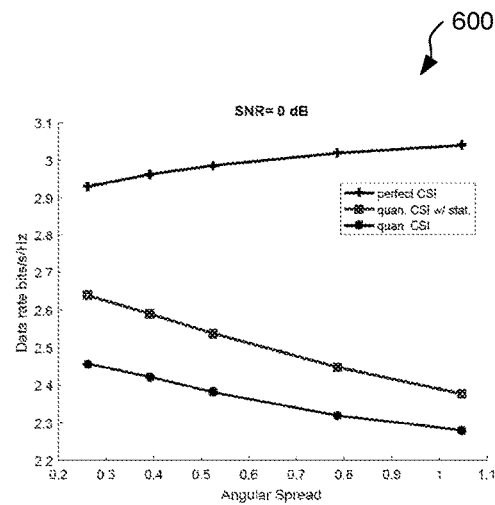
FIG. 6A illustrates a plot showing data rates as a function of angular speed for different pre-coding based on perfect/quantized CSI, for comparison with a single link embodiment (with a BS having M=8 antennas) employing pre-coding based on channel statistics in addition to quantized CSI, where such single link embodiment is for SNR=0 dB.
Figure 6B:
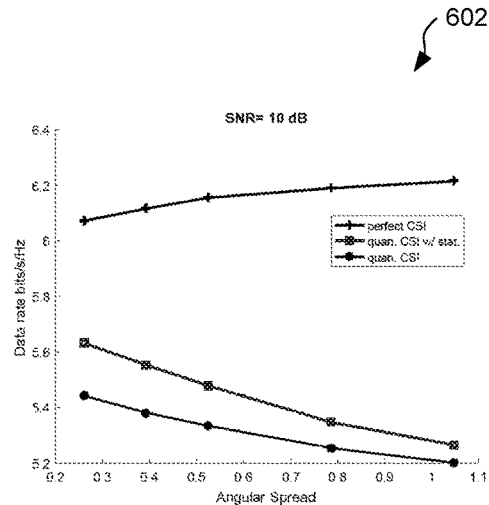
FIG. 6B illustrates a plot showing data rates as a function of angular speed for different pre-coding based on perfect/quantized CSI, for comparison with a single link embodiment (with a BS having M=8 antennas) employing pre-coding based on channel statistics in addition to quantized CSI, where such single link embodiment is for SNR=10 dB.
Figure 6C:
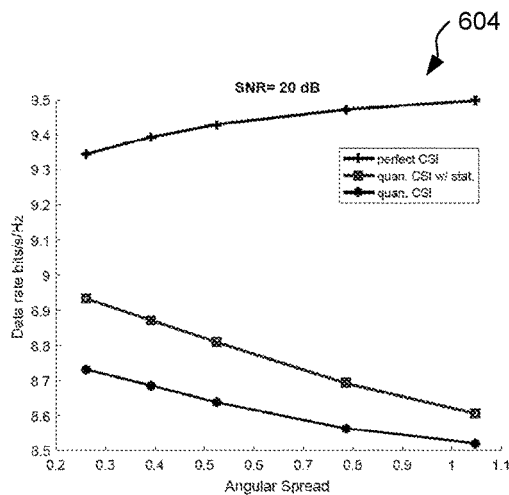
FIG. 6C illustrates a plot showing data rates as a function of angular speed for different pre-coding based on perfect/quantized CSI, for comparison with a single link embodiment (with a BS having M=8 antennas) employing pre-coding based on channel statistics in addition to quantized CSI, where such single link embodiment is for SNR=20 dB.

FIGS. 6A, 6B and 6C illustrate plots showing data rates as a function of angular speed for different pre-coding based on a perfect/quantized CSI, for comparison with single link embodiments (with a BS having M=8 antennas) employing pre-coding based on channel statistics in addition to quantized CSI, where such embodiments vary based on different signal to noise ratios (SNRs). Specifically, FIG. 6A illustrates a plot 600 showing data rates as a function of angular speed for different pre-coding based on perfect/quantized CSI, for comparison with a single link embodiment (with a BS having M=8 antennas) employing pre-coding based on channel statistics in addition to quantized CSI, where such single link embodiment is for SNR=0 dB. Further, FIG. 6B illustrates a plot 602 showing data rates as a function of angular speed for different pre-coding based on perfect/quantized CSI, for comparison with a single link embodiment (with a BS having M=8 antennas) employing pre-coding based on channel statistics in addition to quantized CSI, where such single link embodiment is for SNR=10 dB. Still yet, FIG. 6C illustrates a plot 604 showing data rates as a function of angular speed for different pre-coding based on perfect/quantized CSI, for comparison with a single link embodiment (with a BS having M=8 antennas) employing pre-coding based on channel statistics in addition to quantized CSI, where such single link embodiment is for SNR=20 dB.

For FIGS. 6A, 6B, and 6C, the BS is equipped with M=8 cross-polarized antennas for servicing a UE with N=1 antenna. Further, the LTE 8Tx codebook is utilized with a total of 256 codewords. It is further assumed that the cross polarization coefficient is 0.3. Similar to the previous embodiments of FIGS. 5A, 5B, and 5C, where M=4, knowledge of the channel statistics information is shown to be beneficial to the system performance.

Figure 7:
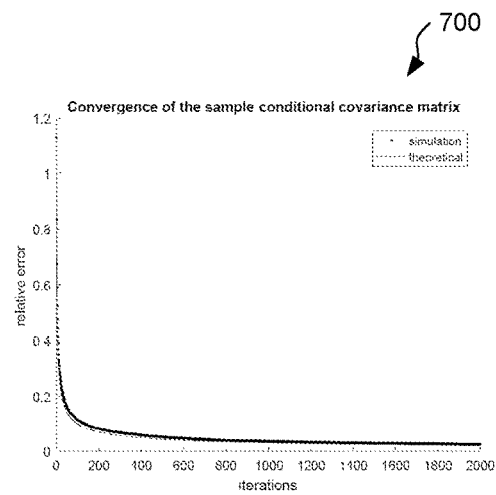
FIG. 7 is a plot showing a relative error in terms of using a sample conditional covariance matrix to estimate the conditional covariance matrix as the number of samples increases, in accordance with an embodiment.

FIG. 7 is a plot 700 showing a relative error in terms of using a sample conditional covariance matrix to estimate the conditional covariance matrix as the number of samples increases, in accordance with an embodiment. As shown, a convergence rate is of order $$\frac{1}{\sqrt{n}},$$

where n is the number of samples.

Figure 8A:
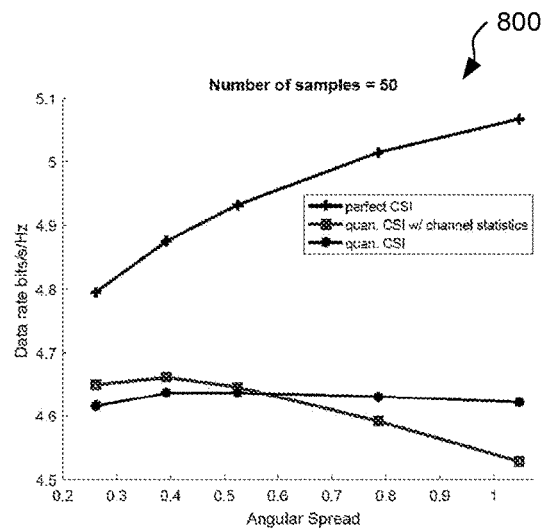
FIG. 8A illustrates a plot showing data rates as a function of angular speed for different pre-coding based on perfect/quantized CSI, for comparison with a single link embodiment (with a BS having M=4 antennas) employing pre-coding based on channel statistics in addition to quantized CSI, where such embodiment involves 50 samples.
Figure 8B:
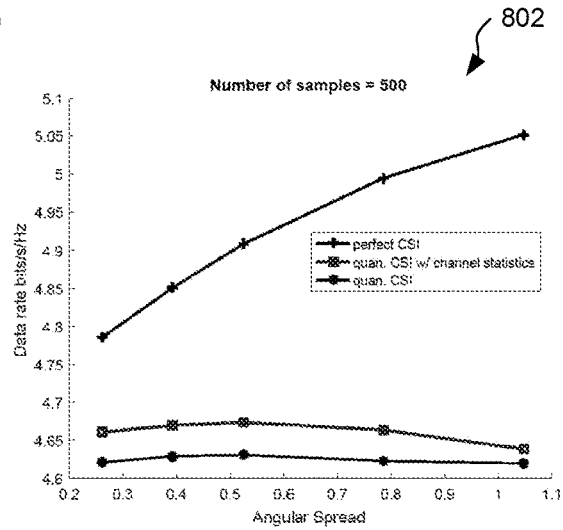
FIG. 8B illustrates a plot showing data rates as a function of angular speed for different pre-coding based on perfect/quantized CSI, for comparison with a single link embodiment (with a BS having M=4 antennas) employing pre-coding based on channel statistics in addition to quantized CSI, where such embodiment involves 500 samples.
Figure 8C:
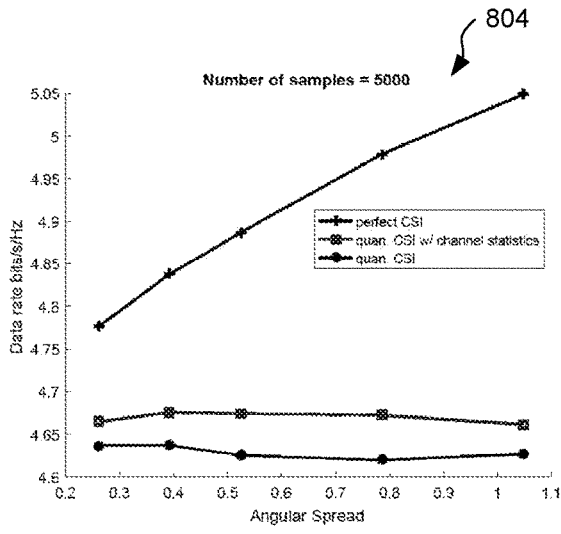
FIG. 8C illustrates a plot showing data rates as a function of angular speed for different pre-coding based on perfect/quantized CSI, for comparison with a single link embodiment (with a BS having M=4 antennas) employing pre-coding based on channel statistics in addition to quantized CSI, where such embodiment involves 5000 samples.

FIGS. 8A, 8B and 8C illustrate plots showing data rates as a function of angular speed for different pre-coding based on a perfect/quantized CSI, for comparison with single link embodiments (with a BS having M=4 antennas) employing pre-coding based on channel statistics in addition to quantized CSI, where such embodiments vary based on different sample amounts. Specifically, FIG. 8A illustrates a plot 800 showing data rates as a function of angular speed for different pre-coding based on perfect/quantized CSI, for comparison with a single link embodiment (with a BS having M=4 antennas) employing pre-coding based on channel statistics in addition to quantized CSI, where such embodiment involves 50 samples. Further, FIG. 8B illustrates a plot 802 showing data rates as a function of angular speed for different pre-coding based on perfect/quantized CSI, for comparison with a single link embodiment (with a BS having M=4 antennas) employing pre-coding based on channel statistics in addition to quantized CSI, where such embodiment involves 500 samples. Still yet, FIG. 8C illustrates a plot 804 showing data rates as a function of angular speed for different pre-coding based on perfect/quantized CSI, for comparison with a single link embodiment (with a BS having M=4 antennas) employing pre-coding based on channel statistics in addition to quantized CSI, where such embodiment involves 5000 samples.

Thus, in FIGS. 8A, 8B and 8C, the scenarios are compared where different numbers of samples are used to obtain sixteen sample conditional covariance matrices. As is evident, when too few samples (e.g. 50) are used to obtain the 16 sample conditional covariance matrices, performance may be worse than that without using the channel statistics information. Now that the foregoing signal link embodiments have been described, more information will now be set forth regarding different multi-link embodiments.

Figure 9:
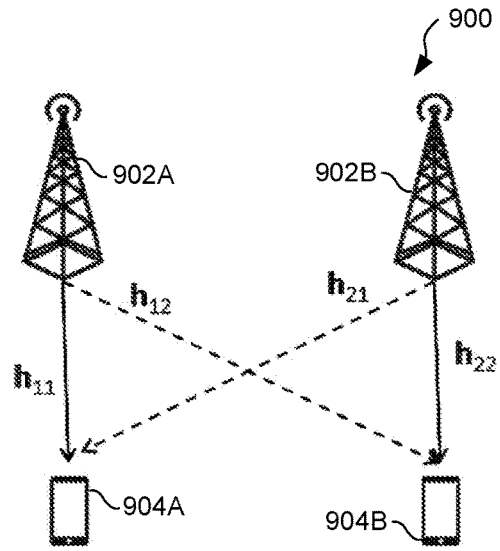
FIG. 9 illustrates a system for pre-coding based on channel statistics, in accordance with a multi-link embodiment.

FIG. 9 illustrates a system 900 for pre-coding based on channel statistics, in accordance with a multi-link embodiment. As shown, for multi-cell coordinated beamforming, the system 900 is equipped with two BSs 902A, 902B and two UEs 904A, 904B, where the BS is equipped with M antennas and the UE is equipped with N=1 antenna. A first BS 902A services a first UE 904A, and a second BS 902B services a second UE 904B. A channel between each BS i and UE j is designated as $h_{i,j}$. The received signal at UE i is set forth by Equation 9.

$$y_i = h_{i,i}^H w_i x_i + \Sigma_{j \neq i} h_{j,i}^H w_j x_j + n_i \quad \text{Equation 9}$$

In use, BS i identifies a unit-norm pre-coding vector $w_i$ for UE i that maximizes a single-to-leakage-plus-noise ratio (SLNR) per Equation 10.

$$SNRL_i = \frac{P|h_{i,i}^H w_i|^2}{\sigma^2 + \gamma P|h_{i,j}^H w_i|^2}, \ j \neq i, \quad \text{Equation 10}$$

where $\gamma$ is the penetration loss for the interference and P is the average receive power at the user terminal from its serving cell, i.e., receive power of UE i from BS i.

Further, assuming that the UE uses a LTE codebook $C = \{c_1, \ldots, c_{|C|}\}$ for the quantized CSI feedback, Equation 11 may be used by UE j to feedback the index, in order to estimate the channel $h_{i,j}$.

$$k_{i,j}^* = \arg\max_{k : c_k \in C} |h_{i,j}^H c_k|, \ i = 1, 2 \quad \text{Equation 11}$$

where $c_k$ is the precoding vector in the codebook C, k=1, ..., |C|. Similar to the single link case, a decision region $A_i$, i=1, ..., |C| is defined by Equation 12.

$$A_i = \{h \in \mathbb{C}^M : |h^H c_i| \geq |h^H c_j|, c_j \in C\}. \quad \text{Equation 12}$$

More information will now be set forth regarding more multi-link embodiments. Specifically, different embodiments will now be described that, when pre-coding, employ different combinations of inter-cell and/or intra-cell CSI, and inter-cell and/or intra-cell channel statistics. In the context of the present description, inter-cell CSI/channel statistics refer to CSI/channel statistics that are obtained using information from multiple different BSs. Further, intra-cell CSI/channel statistics refer to CSI/channel statistics that are obtained using information from a single BS.

For example, embodiments will now be described that, when pre-coding, employ both inter-cell and intra-cell CSI. For comparison purposes, following are multiple scenarios, a first scenario with perfect CSI and a second scenario with the quantized CSI, where the first/second scenario are provided for comparison with a particular embodiment that employs channel statistics (e.g. inter-cell and intra-cell channel statistics, etc.), in addition to the aforementioned quantized CSI.

Regarding the first scenario, the BS i uses the pre-coding vector $w_i^{CSI}$ that is an eigenvector corresponding to a largest eigenvalue of the matrix in Equation 13.

$$\left(\frac{\sigma^2}{P}I + \gamma h_{i,j} h_{i,j}^H\right)^{-1} h_{i,i} h_{i,i}^H, \ j \neq i \quad \text{Equation 13}$$

where I is the identity matrix. The resulting average data rate is denoted as $R_i^{CSI}$, which can be computed per Equation 14.

$$R_i^{CSI} = \mathbb{E}\left[\log\left(1 + \frac{P|h_{i,i}^H w_i^{CSI}|^2}{\sigma^2 + \gamma P|h_{j,i}^H w_j^{CSI}|^2}\right)\right], \ j \neq i \quad \text{Equation 14}$$

Regarding the second scenario, based on the quantized feedback, the BS i uses the pre-coding vector $w_i^{quan.CSI}$ that is t an eigenvector corresponding to a largest eigenvalue of the matrix of Equation 15.

$$\left(\frac{\sigma^2}{P}I + \gamma c_{k_{i,j}^*} c_{k_{i,j}^*}^H\right)^{-1} c_{k_{i,i}^*} c_{k_{i,i}^*}^H, \ j \neq i \quad \text{Equation 15}$$

The resulting average data rate is denoted as $R_i^{quan.CSI}$, which can be computed per Equation 16.

$$R_i^{quan.CSI} = \mathbb{E}\left[\log\left(1 + \frac{P|h_{i,i}^H w_i^{quan.CSI}|^2}{\sigma^2 + \gamma P|h_{j,i}^H w_j^{quan.CSI}|^2}\right)\right], \ j \neq i \quad \text{Equation 16}$$

Turning now to the present embodiment, when both the statistics of $h_{i,j}$ and the quantized feedback are available at the BS, the BS i uses the pre-coding vector $w_i^{quan.CSI \ w/stat}$ that is the eigenvector corresponding to the largest eigenvalue of the following matrix per Equation 17.

$$\left(\frac{\sigma^2}{P}I + \gamma \mathbb{E}\left[h_{i,j} h_{i,j}^H \mid h_{i,j} \in A_{k_{i,j}^*}\right]\right)^{-1} \mathbb{E}\left[h_{i,i} h_{i,i}^H \mid h_{i,i} \in A_{k_{i,i}^*}\right], \ j \neq i \quad \text{Equation 17}$$

where $[h_{i,j} h_{i,j}^H | h_{i,j} \in A_{k_{i,j}^*}]$ is the conditional channel covariance matrix of $h_{i,j}$.

The resulting average data rate is denoted as $R_i^{quan.CSI \ w/stat}$, which can be computed per Equation 18.

$$R_i^{quan.CSI \ w/stat} = \mathbb{E}\left[\log\left(1 + \frac{P|h_{i,i}^H w_i^{quan.CSI \ w/stat}|^2}{\sigma^2 + \gamma P|h_{j,i}^H w_j^{quan.CSI \ w/stat}|^2}\right)\right], \ j \neq i \quad \text{Equation 18}$$

Yet additional embodiments will now be described that, when pre-coding, employ just intra-cell CSI. For comparison purposes, following is a reference scenario with quantized intra-cell CSI, where such scenario is provided for comparison with the present embodiments that employ channel statistics (e.g. inter-cell and/or intra-cell channel statistics, etc.), in addition to the aforementioned quantized intra-cell CSI.

Regarding the exemplary reference scenario, based on the intra-cell quantized feedback, the BS i uses the pre-coding vector $w_i = c_{k_{i,i}^*}$. The resulting average data rate is denoted as $R_i^{quan. \ intra \ CSI}$, which can be computed per Equation 19.

$$R_i^{quan\text{-}intraCSI} = \mathbb{E}\left[\log\left(1 + \frac{P|h_{i,i}^H c_{k_{i,i}^*}|^2}{\sigma^2 + \gamma P|h_{j,i}^H c_{k_{j,j}^*}|^2}\right)\right], j \neq i \quad \text{Equation 19}$$

In comparison, the present embodiment will now be described that employs intra-cell channel statistics in addition to the aforementioned quantized intra-cell CSI. When both the intra-cell statistics of $h_{i,i}$ and the intra-cell quantized feedback are available at the BS, the BS i uses the pre-coding vector $w_i = u_i^*$ that can be computed via Equation 20.

$$u_i^* = \arg\max_{u:\|u\|=1} u^H \mathbb{E}[h_{i,i} h_{i,i}^H \mid h_{i,i} \in A_{k_{i,i}^*}] u \quad \text{Equation 20}$$

The resulting average data rate is denoted as $R_i^{quan.\ intra.\ CSI\ w/intra\ stat}$, which can be computed per Equation 21.

$$R_i^{quan.\ intra.\ CSI\ w/intra\ stat} = \mathbb{E}\left[\log\left(1 + \frac{P|h_{i,i}^H u_i^*|^2}{\sigma^2 + \gamma P|h_{j,i}^H u_i^*|^2}\right)\right], j \neq i \quad \text{Equation 21}$$

Yet another embodiment will now be described that, when pre-coding, employs just intra-cell CSI, as well as both inter-cell and intra-cell channel statistics.

When both the statistics of $h_{i,j}$ and the intra-cell quantized feedback are available at the BS, the BS i uses the pre-coding vector $W_i^{quan.\ intra.\ CSI\ w/stat}$ that is the eigenvector corresponding to the largest eigenvalue of the following matrix per Equation 22.

$$\left(\frac{\sigma^2}{P}I + \gamma \mathbb{E}[h_{i,j} h_{i,j}^H]\right)^{-1} \mathbb{E}[h_{i,i} h_{i,i}^H \mid h_{i,i} \in A_{k_{i,i}^*}], j \neq i \quad \text{Equation 22}$$

The resulting average data rate is denoted as $R_i^{quan.\ intra.\ CSI\ w/stat}$, which can be computed per Equation 23.

$$R_i^{quan.\ intra.\ CSI\ w/stat} = \quad \text{Equation 23}$$
$$\mathbb{E}\left[\log\left(1 + \frac{P|h_{i,i}^H w_i^{quan.\ intra\ CSI\ w/stat}|^2}{\sigma^2 + \gamma P|h_{j,i}^H w_j^{quan.\ intra\ CSI\ w/stat}|^2}\right)\right], j \neq i$$

Yet another embodiment will now be described that, when pre-coding, employs just intra-cell CSI, as well as just inter-cell channel statistics.

When both the inter-cell statistics of $h_{i,j}$ and the intra-cell quantized feedback are available at the BS, the BS i uses the pre-coding vector $W_i^{quan.\ intra.\ CSI\ w/inter.stat}$ that is the eigenvector corresponding to the largest eigenvalue of the following matrix per Equation 24.

$$\left(\frac{\sigma^2}{P}I + \gamma \mathbb{E}[h_{i,j} h_{i,j}^H]\right)^{-1} c_{k_{i,i}^*} c_{k_{i,i}^*}^H, j \neq i \quad \text{Equation 24}$$

The resulting average data rate is denoted as $R_i^{quan.intra.CSIw/inter.stat.}$, which can be computed in accordance with Equation 25.

$$R_i^{quan.\ intra.\ CSI\ w/inter.\ stat} = \quad \text{Equation 25}$$
$$\mathbb{E}\left[\log\left(1 + \frac{P|h_{i,i}^H w_i^{quan.\ intra\ CSI\ w/inter.\ stat}|^2}{\sigma^2 + \gamma P|h_{j,i}^H w_j^{quan.\ intra\ CSI\ w/stat}|^2}\right)\right], j \neq i$$

FIGS. 10A, 10B and 10C illustrate plots showing data rates as a function of angular speed for different pre-coding based on a perfect/quantized CSI, for comparison with multi-link embodiments (with a BS having M=4 antennas) employing pre-coding based on channel statistics in addition to quantized CSI, where such embodiments vary based on different signal to noise ratios (SNRs). Specifically, FIG. 10A illustrates a plot 1000 showing data rates as a function of angular speed for different pre-coding based on perfect/quantized CSI, for comparison with a multi-link embodiment (with a BS having M=4 antennas) employing pre-coding based on channel statistics in addition to quantized CSI, where such multi-link embodiment is for SNR=0 dB. Further, FIG. 10B illustrates a plot 1002 showing data rates as a function of angular speed for different pre-coding based on perfect/quantized CSI, for comparison with a multi-link embodiment (with a BS having M=4 antennas) employing pre-coding based on channel statistics in addition to quantized CSI, where such multi-link embodiment is for SNR=10 dB. Still yet, FIG. 10C illustrates a plot 1004 showing data rates as a function of angular speed for different pre-coding based on perfect/quantized CSI, for comparison with a multi-link embodiment (with a BS having M=4 antennas) employing pre-coding based on channel statistics in addition to quantized CSI, where such multi-link embodiment is for SNR=20 dB.

In FIGS. 10A, 10B and 10C, two BSs are provided with M=4 antennas and two UEs are provided with N=1 antenna. The channel $h_{i,j}$ is generated by using a one-ring scattering model. A penetration loss for the interference is assumed to be γ=1. As shown, the achieved data rates are compared in the following seven scenarios: 1) a perfect CSI scenario where the BS has a perfect intra-cell and inter-cell CSI, 2) a quantized CSI with statistics scenario where the BS has a quantized intra-cell and inter-cell CSI and intra-cell and inter-cell channel statistics, 3) a quantized CSI scenario where the BS has a quantized intra-cell and inter-cell CSI, 4) a quantized intra-cell CSI with statistics scenario where the BS has a quantized intra-cell CSI and intra-cell and inter-cell channel statistics, 5) a quantized intra-cell CSI with intra-cell statistics scenario where the BS has a quantized intra-cell CSI and intra-cell channel statistics, 6) a quantized intra-cell CSI scenario where the BS has a quantized intra-cell CSI, and 7) a quantized intra-cell CSI with inter statistics scenario where the BS has a quantized intra-cell CSI and inter-cell channel statistics. As shown, knowledge of channel statistics information may be beneficial to the system performance for all the cases.

Figure 11A:
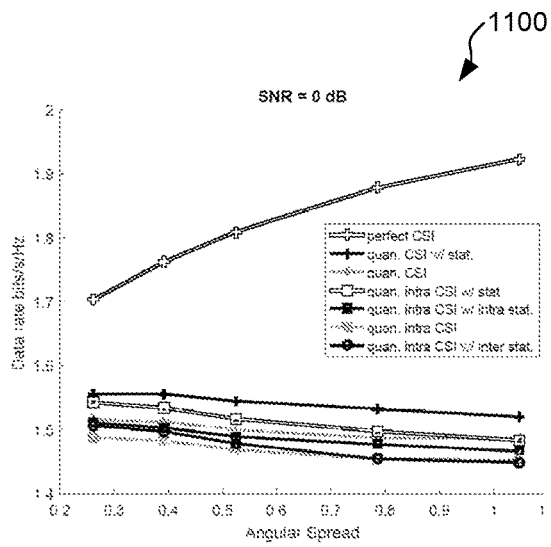
FIG. 11A illustrates a plot showing data rates as a function of angular speed for different pre-coding based on perfect/quantized CSI, for comparison with a multi-link embodiment (with a BS having M=4 antennas and a penetration loss for interference being $\gamma=0.5$) employing pre-coding based on channel statistics in addition to quantized CSI, where such multi-link embodiment is for SNR=0 dB.
Figure 11B:
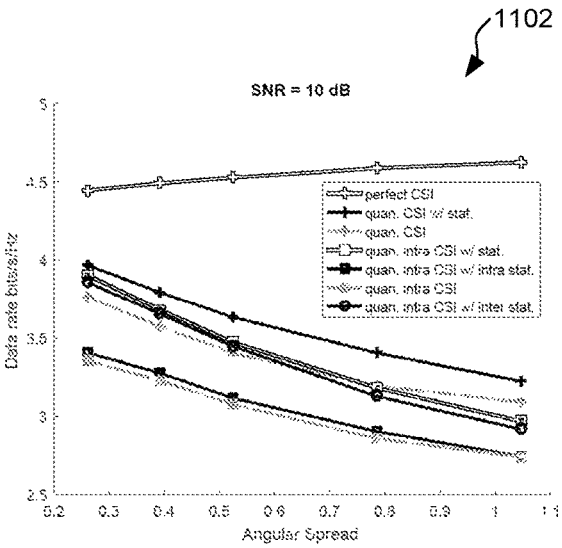
FIG. 11B illustrates a plot showing data rates as a function of angular speed for different pre-coding based on perfect/quantized CSI, for comparison with a multi-link embodiment (with a BS having M=4 antennas and a penetration loss for interference being $\gamma=0.5$) employing pre-coding based on channel statistics in addition to quantized CSI, where such multi-link embodiment is for SNR=10 dB.
Figure 11C:
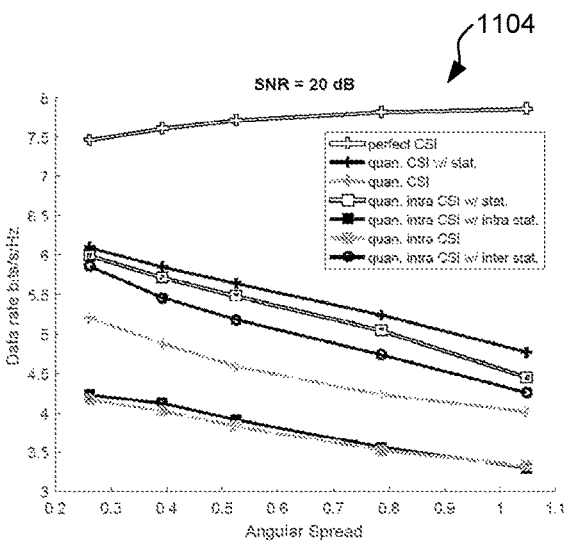
FIG. 11C illustrates a plot showing data rates as a function of angular speed for different pre-coding based on perfect/quantized CSI, for comparison with a multi-link embodiment (with a BS having M=4 antennas and a penetration loss for interference being $\gamma=0.5$) employing pre-coding based on channel statistics in addition to quantized CSI, where such multi-link embodiment is for SNR=20 dB.

FIGS. 11A, 11B and 11C illustrate plots showing data rates as a function of angular speed for different pre-coding based on a perfect/quantized CSI, for comparison with multi-link embodiments (with a BS having M=4 antennas and a penetration loss for interference being γ=0.5) employing pre-coding based on channel statistics in addition to quantized CSI, where such embodiments vary based on different signal to noise ratios (SNRs). Specifically, FIG. 11A illustrates a plot 1100 showing data rates as a function of angular speed for different pre-coding based on perfect/quantized CSI, for comparison with a multi-link embodiment (with a BS having M=4 antennas and a penetration loss for interference being γ=0.5) employing pre-coding based on channel statistics in addition to quantized CSI, where such multi-link embodiment is for SNR=0 dB. Further, FIG. 11B illustrates a plot 1102 showing data rates as a function of angular speed for different pre-coding based on perfect/ quantized CSI, for comparison with a multi-link embodiment (with a BS having M=4 antennas and a penetration loss for interference being γ=0.5) employing pre-coding based on channel statistics in addition to quantized CSI, where such multi-link embodiment is for SNR=10 dB. Still yet, FIG. 11C illustrates a plot 1104 showing data rates as a function of angular speed for different pre-coding based on perfect/ quantized CSI, for comparison with a multi-link embodiment (with a BS having M=4 antennas and a penetration loss for interference being γ=0.5) employing pre-coding based on channel statistics in addition to quantized CSI, where such multi-link embodiment is for SNR=20 dB.

As shown in FIGS. 11A, 11B and 11C, a penetration loss for the interference is assumed to be γ=0.5. Again, as illustrated, knowledge of the channel statistics information may be beneficial to the system performance.

Figure 12A:
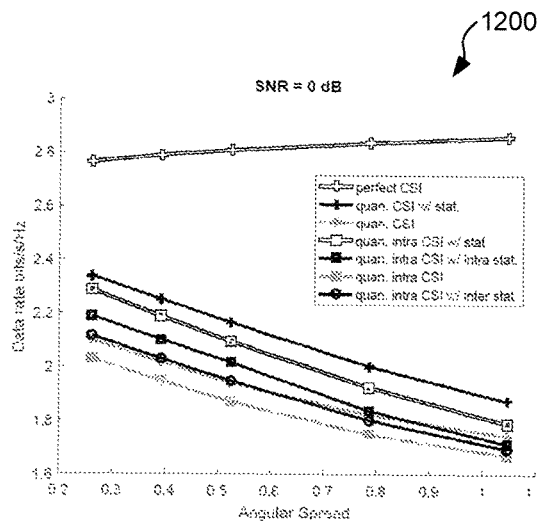
FIG. 12A illustrates a plot showing data rates as a function of angular speed for different pre-coding based on perfect/quantized CSI, for comparison with a multi-link embodiment (with a BS having M=8 antennas and a cross polarization coefficient of 0.3) employing pre-coding based on channel statistics in addition to quantized CSI, where such multi-link embodiment is for SNR=0 dB.
Figure 12B:
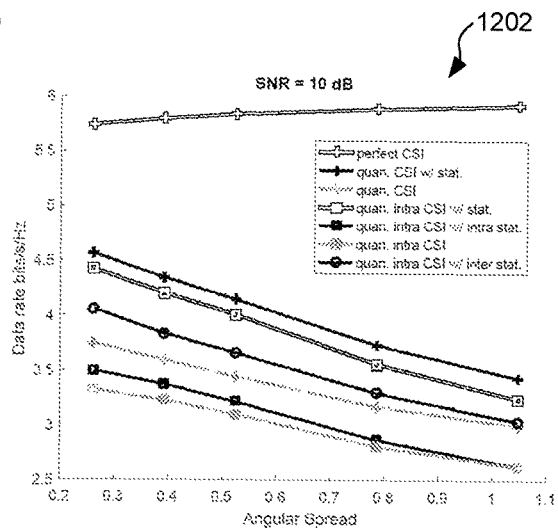
FIG. 12B illustrates a plot showing data rates as a function of angular speed for different pre-coding based on perfect/quantized CSI, for comparison with a multi-link embodiment (with a BS having M=8 antennas and a cross polarization coefficient of 0.3) employing pre-coding based on channel statistics in addition to quantized CSI, where such multi-link embodiment is for SNR=10 dB.
Figure 12C:
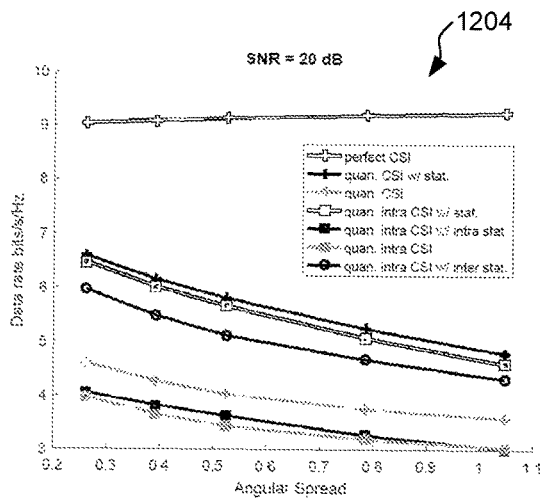
FIG. 12C illustrates a plot showing data rates as a function of angular speed for different pre-coding based on perfect/quantized CSI, for comparison with a multi-link embodiment (with a BS having M=8 antennas and a cross polarization coefficient of 0.3) employing pre-coding based on channel statistics in addition to quantized CSI, where such multi-link embodiment is for SNR=20 dB.

FIGS. 12A, 12B and 12C illustrate plots showing data rates as a function of angular speed for different pre-coding based on a perfect/quantized CSI, for comparison with multi-link embodiments (with a BS having M=8 antennas and a cross polarization coefficient of 0.3) employing pre-coding based on channel statistics in addition to quantized CSI, where such embodiments vary based on different signal to noise ratios (SNRs). Specifically, FIG. 12A illustrates a plot 1200 showing data rates as a function of angular speed for different pre-coding based on perfect/quantized CSI, for comparison with a multi-link embodiment (with a BS having M=8 antennas and a cross polarization coefficient of 0.3) employing pre-coding based on channel statistics in addition to quantized CSI, where such multi-link embodiment is for SNR=0 dB. Further, FIG. 12B illustrates a plot 1202 showing data rates as a function of angular speed for different pre-coding based on perfect/quantized CSI, for comparison with a multi-link embodiment (with a BS having M=8 antennas and a cross polarization coefficient of 0.3) employing pre-coding based on channel statistics in addition to quantized CSI, where such multi-link embodiment is for SNR=10 dB. Still yet, FIG. 12C illustrates a plot 1204 showing data rates as a function of angular speed for different pre-coding based on perfect/quantized CSI, for comparison with a multi-link embodiment (with a BS having M=8 antennas and a cross polarization coefficient of 0.3) employing pre-coding based on channel statistics in addition to quantized CSI, where such multi-link embodiment is for SNR=20 dB.

As shown in FIGS. 12A, 12B and 12C, there are two BSs with M=8 cross-polarized antennas and two UEs with N=1 antenna, and the cross polarization coefficient is 0.3. Similar to the case with M=4, the knowledge of the channel statistics information may be beneficial to the system performance.

More information will now be set forth regarding various embodiments that incorporate one or more of the features set forth hereinabove (e.g. channel statistics-based pre-coding), but also incorporate single or multiple layer receiver combining. In the context of the present description, receiver combining refers to any system that exploits differences in any mechanism (e.g. spatial, polar, etc.) of a receiver channel for the purpose of combining (and processing) signals received via each of the different mechanisms to improve overall reception.

For example, in one embodiment, there may be one BS and one UE, where the BS may be equipped with M antennas and the UE may be equipped with N antennas. Further, the BS may send one data stream (single layer) to the UE and the UE may employ receiver combining to maximize the received SNR. The following description assumes that the channel between the BS and the UE is denoted as $H=[h_1 \ldots h_N]^T$, where $h_j$ is the channel between the BS and the j-th UE antenna. Given a pre-coding vector w, the optimal unit vector z for receiver combining that maximizes the received signal power $|z^H H w|^2$ is $z=Hw/\|Hw\|$. As a result, a unit-norm pre-coding vector w is obtained such that the received signal power $\|Hw\|^2$ is maximized.

In a case where the UE uses a LTE codebook $C=\{c_1, \ldots, c_{|C|}\}$ for the quantized CSI feedback, the UE feedbacks an index as follows in Equation 26.

$$i^* = \arg \max_{i: c_i \in C} \|Hc_i\| \qquad \text{Equation 26}$$

In such case, the decision region $A_i$, i=1, ..., |C| is defined per Equation 27.

$$A_i \triangleq \{H \in \mathbb{C}^{N \times M}: \|Hc_i\| \geq \|Hc_j\|, c_j \in C\}. \qquad \text{Equation 27}$$

For comparison purposes, multiple scenarios (involving a single link with single layer receiver combining) will be described, namely a first scenario with perfect CSI and a second scenario with the quantized CSI, where the first/ second scenarios are provided for comparison with a particular embodiment that employs channel statistics in addition to the aforementioned quantized CSI.

Regarding the first scenario, the BS uses a pre-coding vector $w=u^{CSI}$ per Equation 28.

$$u^{CSI} = \arg \max_{u: \|u\|=1} u^H H^H H u \qquad \text{Equation 28}$$

In other words, $u^{CSI}$ is the dominant right singular vector of H. The resulting average data rate is denoted as $R^{CSI}$, which can be computed per Equation 29.

$$R^{CSI} = \mathbb{E}\left[\log\left(1 + \frac{P\|Hu^{CSI}\|^2}{\sigma^2}\right)\right] \qquad \text{Equation 29}$$

Regarding the second scenario based on the quantized feedback, the BS uses the pre-coding vector $w=c_{i^*}$. The resulting average data rate is denoted as $R^{quan. CSI}$ which can be computed per Equation 30.

$$R^{quan. CSI} = \mathbb{E}\left[\log\left(1 + \frac{P\|Hc_{i^*}\|^2}{\sigma^2}\right)\right] \qquad \text{Equation 30}$$

Turning now to the present embodiment when both the statistics of H and the quantized feedback are available at the BS, the BS uses the pre-coding vector $w=u^{quan. CSI\ w/stat}$ per Equation 31.

$$u^{quan. CSI\ w/stat} = \arg \max_{u: \|u\|=1} u^H \mathbb{E}[H^H H \mid H \in A_{i^*}] u \qquad \text{Equation 31}$$

-continued $$u^{quan.\ CSI\ w/stat} = \arg\max_{u:\|u\|=1} u^H \left( \sum_{j=1}^{N} \mathbb{E}[h_j h_j^H \mid H \in A_{i^*}] \right) u$$

The resulting average data rate is denoted as $R^{quan.\ CSI\ w/stat}$, which can be computed per Equation 32.

$$R^{quan\cdot CSIw/stat} = \mathbb{E}\left[\log\left(1 + \frac{P\|Hw\|^2}{\sigma^2}\right)\right] \qquad \text{Equation 32}$$

Figure 13C:
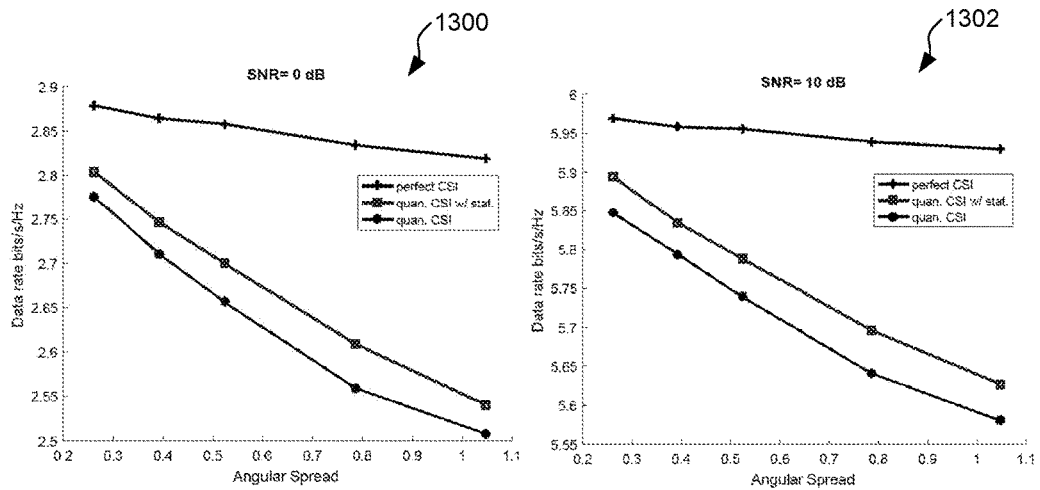
FIG. 13C illustrates a plot showing data rates as a function of angular speed for different pre-coding based on perfect/quantized CSI, for comparison with a single link embodiment (with a BS having M=4 antennas, the UE having N=2 antennas, and single layer receiver combining) employing pre-coding based on channel statistics in addition to quantized CSI, where such single link embodiment is for SNR=20 dB.
Figure 13C:
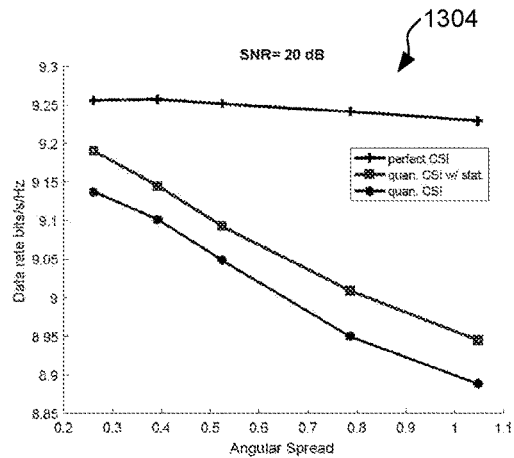

FIGS. 13A, 13B and 13C illustrate plots showing data rates as a function of angular speed for different pre-coding based on a perfect/quantized CSI, for comparison with single link embodiments (with a BS having M=4 antennas, the user equipment (UE) having N=2 antennas, and single layer receiver combining) employing pre-coding based on channel statistics in addition to quantized CSI, where such embodiments vary based on different signal to noise ratios (SNRs). Specifically, FIG. 13A illustrates a plot 1300 showing data rates as a function of angular speed for different pre-coding based on perfect/quantized CSI, for comparison with a single link embodiment (with a BS having M=4 antennas, the user equipment (UE) having N=2 antennas, and single layer receiver combining) employing pre-coding based on channel statistics in addition to quantized CSI, where such single link embodiment is for SNR=0 dB. Further, FIG. 13B illustrates a plot 1302 showing data rates as a function of angular speed for different pre-coding based on perfect/quantized CSI, for comparison with a single link embodiment (with a BS having M=4 antennas, the user equipment (UE) having N=2 antennas, and single layer receiver combining) employing pre-coding based on channel statistics in addition to quantized CSI, where such single link embodiment is for SNR=10 dB. Still yet, FIG. 13C illustrates a plot 1304 showing data rates as a function of angular speed for different pre-coding based on perfect/ quantized CSI, for comparison with a single link embodiment (with a BS having M=4 antennas, the user equipment (UE) having N=2 antennas, and single layer receiver combining) employing pre-coding based on channel statistics in addition to quantized CSI, where such single link embodiment is for SNR=20 dB.

In FIGS. 13A, 13B and 13C, a BS with M=4 antennas transmits one data stream (single layer) to a UE with N=2 antennas. The channel H is generated by using a one-ring scattering model with different values of the angular spread. The channels at the receiver side $h_1$ and $h_2$ are independent. Assuming use of an LTE 4Tx codebook with a total of 16 codewords, the achieved data rates are compared in the following three scenarios: the perfect CSI scenario where the BS has the perfect CSI, the quantized CSI scenario where the BS has a quantized CSI, and the quantized CSI with channel statistics scenario where the BS has both the quantized CSI and the channel statistics. As shown, with such knowledge of the channel statistics information, the system performance is improved for all the cases.

More information will now be set forth regarding various multi-link embodiments employing single layer receiver combining. In such embodiments, there are two BSs and two UEs, where the BS is equipped with M antennas and the UE is equipped with N antennas. In use, the BS sends one data stream (single layer) to the UE and the UE employs receiver combining to maximize the received signal power. The channel between the BS i and the UE j is denoted as $H_{i,j}=[h_{i,j,1} \ldots h_{i,j,N}]^T$, where $h_{i,j,k}$ is the channel between the BS i and the k-th antenna of UE j. Given a pre-coding vector $w_i$, the optimal unit vector $z_i$ for receiver combining that maximizes the received signal power may be calculated per Equation 33.

$$|z_i^H H_{i,i} w_i|^2 \text{ is } z_i = H_{i,i} w_i / \|H_{i,i} w_i\|. \qquad \text{Equation 33}$$

The BS i aims to find a unit-norm pre-coding vector $w_i$ that maximizes a signal-to-leakage-plus-noise ratio (SLNR) in accordance with Equation 34.

$$SLNR_i = \frac{P\|H_{i,i} w_i\|^2}{\sigma^2 + \gamma P\|H_{i,j} w_i\|^2},\ j \neq i \qquad \text{Equation 34}$$

The UE uses a LTE codebook $C=\{c_1, \ldots, c_{|C|}\}$ for the quantized CSI feedback. The UE j feedbacks the indexes per Equation 35.

$$l_{i,j}^* = \arg\max_{i:\ c_i \in C} \|H_{i,j} c_i\|,\ i = 1, 2. \qquad \text{Equation 35}$$

Further, the decision region $A_l$, $l=1, \ldots, |C|$ is defined in accordance with Equation 36.

$$A_l \triangleq \{H \in \mathbb{C}^{N \times M} : \|Hc_l\| \geq \|Hc_m\|, c_m \in C\} \qquad \text{Equation 36}$$

Various embodiments will now be described employing single layer receiver combining in a multi-link environment. For comparison purposes, following are multiple scenarios, a first scenario with perfect inter-cell and intra-cell CSI and a second scenario with the quantized inter-cell and intra-cell CSI, where the first/second scenarios are provided for comparison with particular embodiments that employ channel statistics in addition to the aforementioned quantized CSI.

Specifically, following is a reference example of the first scenario where pre-coding is based on perfect inter-cell and intra-cell CSI. The BS i uses the pre-coding vector $w_i$ that is the eigenvector corresponding to the largest eigenvalue of the following matrix per Equation 37.

$$\left(\frac{\sigma^2}{P}I + \gamma H_{i,j}^H H_{i,j}\right)^{-1} H_{i,i}^H H_{i,i},\ j \neq i \qquad \text{Equation 37}$$

The resulting average data rate is denoted as $R_i^{CSI}$, which can be computed per Equation 38.

$$R_i^{CSI} = \mathbb{E}\left[\log\left(1 + \frac{P\|H_{i,i} w_i\|^2}{\sigma^2 + \gamma P|w_i^H H_{i,i}^H H_{j,i} w_j|^2 / \|H_{i,i} w_i\|^2}\right)\right],\ j \neq i \qquad \text{Equation 38}$$

Further, following is a reference example of the second scenario where pre-coding is based on quantized inter-cell and intra-cell CSI. Based on the quantized feedback, the BS i uses the pre-coding vector $w_i$ that is the eigenvector corresponding to the largest eigenvalue of the following matrix per Equation 39.

$$\left(\frac{\sigma^2}{P}I + \gamma c_{l_{i,j}^*} c_{l_{i,j}^*}^H\right)^{-1} \left(c_{l_{i,i}^*} c_{l_{i,i}^*}^H\right),\ j \neq i \qquad \text{Equation 39}$$

The resulting average data rate is denoted as $R_i^{quan.\ CSI}$, which can be computed per Equation 40.

$$R_i^{quan.\ CSI} = \qquad\qquad\text{Equation 40}$$

$$\mathbb{E}\left[\log\left(1 + \frac{P\|H_{i,i}w_i\|^2}{\sigma^2 + \gamma P|w_i^H H_{i,i}^H H_{j,i} w_j|^2 / \|H_{i,i}w_i\|^2}\right)\right], j \neq i$$

Turning now to the present embodiment, when both the statistics of $H_{i,j}$ and the quantized feedback are available at the BS, the BS i uses the pre-coding vector $w_i$ that is the eigenvector corresponding to the largest eigenvalue of the following matrix per Equation 41.

$$\left(\frac{\sigma^2}{P}I + \gamma\mathbb{E}[H_{i,j}^H H_{i,j} | H_{i,j} \in A_{l_{i,j}^*}]\right)^{-1} \mathbb{E}[H_{i,i}^H H_{i,i} | H_{i,i} \in A_{l_{i,i}^*}] = \qquad\text{Equation 41}$$

$$\left(\frac{\sigma^2}{P}I + \gamma\sum_{k=1}^{N}\mathbb{E}[h_{i,j,k} h_{i,j,k}^H | H_{i,j} \in A_{l_{i,j}^*}]\right)^{-1}$$

$$\left(\sum_{k=1}^{N}\mathbb{E}[h_{i,i,k} h_{i,i,k}^H | H_{i,i} \in A_{l_{i,i}^*}]\right), j \neq i$$

The resulting average data rate is denoted as $R_i^{quan.\ CSI\ w/stat}$, which can be computed per Equation 42.

$$R_i^{quan.\ CSI\ w/stat} = \qquad\qquad\text{Equation 42}$$

$$\mathbb{E}\left[\log\left(1 + \frac{P\|H_{i,i}w_i\|^2}{\sigma^2 + \gamma P|w_i^H H_{i,i}^H H_{j,i} w_j|^2 / \|H_{i,i}w_i\|^2}\right)\right], j \neq i$$

For additional comparison purposes, following is a description of a scenario with quantized intra-cell CSI. Based on the quantized feedback, the BS i uses the pre-coding vector $w_i = c_{l_{i,i}^*}$. The resulting average data rate is denoted as $R_i^{quan.\ intra\ CSI}$, which can be computed per Equation 43.

$$R_i^{quan.\ intra\ CSI} = \qquad\qquad\text{Equation 43}$$

$$\mathbb{E}\left[\log\left(1 + \frac{P\|H_{i,i}w_i\|^2}{\sigma^2 + \gamma P|w_i^H H_{i,i}^H H_{j,i} w_j|^2 / \|H_{i,i}w_i\|^2}\right)\right], j \neq i$$

Turning now to one embodiment where both the intra-cell statistics of $H_{i,i}$ and the intra-cell quantized feedback are available at the BS, the BS i uses the pre-coding vector $w_i = u^*_i$ per Equation 44:

$$u_i^* = \arg\max_{u: \|u\|=1} u^H \mathbb{E}[H_{i,i}^H H_{i,i} | H_{i,i} \in A_{l_{i,i}^*}] u \qquad\text{Equation 44}$$

The resulting average data rate is denoted as $R_i^{quan.\ intra\ CSI\ w/intra.\ stat.}$, which can be computed per Equation 45.

$$R_i^{quan.\ intra\ CSI\ w/intra.\ stat.} = \qquad\text{Equation 45}$$

$$\mathbb{E}\left[\log\left(1 + \frac{P\|H_{i,i}w_i\|^2}{\sigma^2 + \gamma P|w_i^H H_{i,i}^H H_{j,i} w_j|^2 / \|H_{i,i}w_i\|^2}\right)\right], j \neq i$$

Turning now to another particular embodiment where both the intra-cell and inter-cell statistics of $H_{i,j}$ are available at the BS along with the intra-cell quantized feedback, the BS i uses the pre-coding vector $w_i$ that is the eigenvector corresponding to the largest eigenvalue of the following matrix per Equation 46.

$$\left(\frac{\sigma^2}{P}I + \gamma\mathbb{E}[H_{i,j}^H H_{i,j}]\right)^{-1} \mathbb{E}[H_{i,i}^H H_{i,i} | H_{i,i} \in A_{l_{i,i}^*}] = \qquad\text{Equation 46}$$

$$\left(\frac{\sigma^2}{P}I + \gamma\sum_{k=1}^{N}\mathbb{E}[h_{i,j,k} h_{i,j,k}^H]\right)^{-1}$$

$$\left(\sum_{k=1}^{N}\mathbb{E}[h_{i,i,k} h_{i,i,k}^H | H_{i,i} \in A_{l_{i,i}^*}]\right), j \neq i$$

The resulting average data rate is denoted as $R_i^{quan.\ intra.\ CSI\ w/stat.}$, which can be computed Equation 47.

$$R_i^{quan.\ intra.\ CSI\ w/stat.} = \qquad\qquad\text{Equation 47}$$

$$\mathbb{E}\left[\log\left(1 + \frac{P\|H_{i,i}w_i\|^2}{\sigma^2 + \gamma P|w_i^H H_{i,i}^H H_{j,i} w_j|^2 / \|H_{i,i}w_i\|^2}\right)\right], j \neq i$$

Turning now to yet another particular embodiment where both the inter-cell statistics of $H_{i,j}$ and the intra-cell quantized feedback are available at the BS, the BS i uses the pre-coding vector $w_i$ that is the eigenvector corresponding to the largest eigenvalue of the following matrix of Equation 48.

$$\left(\frac{\sigma^2}{P}I + \gamma\mathbb{E}[H_{i,j}^H H_{i,j}]\right)^{-1} \left(c_{l_{i,i}^*} c_{l_{i,i}^*}^H\right) = \qquad\text{Equation 48}$$

$$\left(\frac{\sigma^2}{P}I + \gamma\sum_{k=1}^{N}\mathbb{E}[h_{i,j,k} h_{i,j,k}^H]\right)^{-1} \left(c_{l_{i,i}^*} c_{l_{i,i}^*}^H\right), j \neq i$$

The resulting average data rate is denoted as $R_i^{quan.\ intra.\ CSI\ w/inter.\ stat.}$, which can be computed per Equation 49.

$$R_i^{quan.\ intra.\ CSI\ w/inter.\ stat.} = \qquad\text{Equation 49}$$

$$\mathbb{E}\left[\log\left(1 + \frac{P\|H_{i,i}w_i\|^2}{\sigma^2 + \gamma P|w_i^H H_{i,i}^H H_{j,i} w_j|^2 / \|H_{i,i}w_i\|^2}\right)\right], j \neq i$$

Figure 14A:
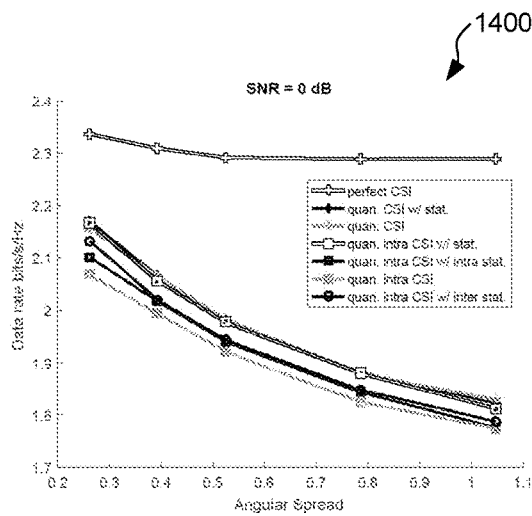
FIG. 14A illustrates a plot showing data rates as a function of angular speed for different pre-coding based on perfect/quantized CSI, for comparison with a multi-link embodiment (with a BS having M=4 antennas, the UE having N=2 antennas, and single layer receiver combining) employing pre-coding based on channel statistics in addition to quantized CSI, where such multi-link embodiment is for SNR=0 dB.
Figure 14B:
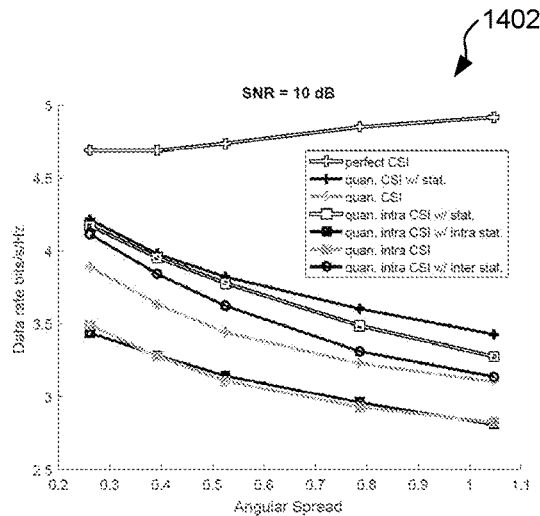
FIG. 14B illustrates a plot showing data rates as a function of angular speed for different pre-coding based on perfect/quantized CSI, for comparison with a multi-link embodiment (with a BS having M=4 antennas, the UE having N=2 antennas, and single layer receiver combining) employing pre-coding based on channel statistics in addition to quantized CSI, where such multi-link embodiment is for SNR=10 dB.
Figure 14C:
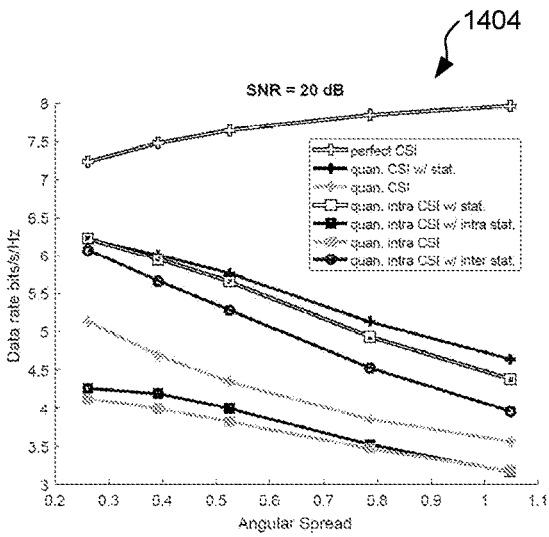
FIG. 14C illustrates a plot showing data rates as a function of angular speed for different pre-coding based on perfect/quantized CSI, for comparison with a multi-link embodiment (with a BS having M=4 antennas, the UE having N=2 antennas, and single layer receiver combining) employing pre-coding based on channel statistics in addition to quantized CSI, where such multi-link embodiment is for SNR=20 dB.

FIGS. 14A, 14B and 14C illustrate plots showing data rates as a function of angular speed for different pre-coding based on a perfect/quantized CSI, for comparison with multi-link embodiments (with a BS having M=4 antennas, the UE having N=2 antennas, and single layer receiver combining) employing pre-coding based on channel statistics in addition to quantized CSI, where such embodiments vary based on different signal to noise ratios (SNRs). Specifically, FIG. 14A illustrates a plot 1400 showing data rates as a function of angular speed for different pre-coding based on perfect/quantized CSI, for comparison with a multi-link embodiment (with a BS having M=4 antennas, the UE having N=2 antennas, and single layer receiver combining) employing pre-coding based on channel statistics in addition to quantized CSI, where such multi-link embodiment is for SNR=0 dB. Further, FIG. 14B illustrates a plot 1402 showing data rates as a function of angular speed for different pre-coding based on perfect/quantized CSI, for comparison with a multi-link embodiment (with a BS having M=4 antennas, the UE having N=2 antennas, and single layer receiver combining) employing pre-coding based on channel statistics in addition to quantized CSI, where such multi-link embodiment is for SNR=10 dB. Still yet, FIG. 14C illustrates a plot 1404 showing data rates as a function of angular speed for different pre-coding based on perfect/quantized CSI, for comparison with a multi-link embodiment (with a BS having M=4 antennas, the UE having N=2 antennas, and single layer receiver combining) employing pre-coding based on channel statistics in addition to quantized CSI, where such multi-link embodiment is for SNR=20 dB.

In FIGS. 14A, 14B and 14C, there are two BSs with M=4 antennas and two UEs with N=2 antennas. A first one of the BSs (BS 1) transmits one data stream (a single layer) to a first one of the UEs (UE 1), and a second one of the BSs (BS) 2 transmits one data stream to a second one of the UEs (UE 2). The channel $H_{i,j}$ is generated by using a one-ring scattering model with different values of the angular spread. The channels at the receiver side $h_{i,j,1}$ and $h_{i,j,2}$ are assumed to be independent. The LTE 4Tx codebook is further used with a total of 16 codewords. Further, a penetration loss for the interference is assumed to be γ=1. As shown, achieved data rates are compared in the following seven scenarios: 1) a perfect CSI scenario where the BS has the perfect intra-cell and inter-cell CSI, 2) a quantized CSI with statistics scenario where the BS has the quantized intra-cell and inter-cell CSI and the intra-cell and inter-cell channel statistics, 3) a quantized CSI scenario where the BS has the quantized intra-cell and inter-cell CSI, 4) a quantized intra-cell CSI with statistics scenario where the BS has the quantized intra-cell CSI and the intra-cell and inter-cell channel statistics, 5) a quantized intra-cell CSI with intra-cell statistics scenario where the BS has the quantized intra-cell CSI and the intra-cell channel statistics, 6) a quantized intra-cell CSI scenario where the BS has the quantized intra-cell CSI, and 7) a quantized intra CSI with inter-cell statistics scenario where the BS has the quantized intra-cell CSI and the inter-cell channel statistics. As shown, the knowledge of the channel statistics information may be beneficial to the system performance for all the cases.

More information will be set for regarding single link embodiments with multiple layers. Specifically, provided are one BS and one UE, where the BS is equipped with M antennas and the UE is equipped with N antennas. In use, the BS sends K data streams (K layers) to the UE. The channel between the BS and the UE is denoted as $H=[h_1 \ldots h_N]^T$, where $h_j$ is the channel between the BS and the j-th UE antenna. Given a pre-coding matrix W, the matched filter is applied at the receiver side, i.e., $W^H H^H/\|HW\|$. As a result, a pre-coding matrix W (with unit-norm columns) is identified such that the received signal power $Tr(W^H H^H HW)$ is maximized and $W^H H^H HW$ is a diagonal matrix (so that there is no inter-stream interference).

The UE uses a LTE codebook $C=\{C_1, \ldots, C_{|C|}\}$ and the UE feedbacks the index per Equation 50.

$$i^* = \arg\max_{i: C_i \in C} Tr(C_i^H H^H H C_i) \quad \text{Equation 50}$$

The decision region $A_i$, i=1, ..., |C| per Equation 51.

$$A_i \triangleq \{H \in \mathbb{C}^{N \times M}: Tr(C_i^H H^H H C_i) \geq Tr(C_j^H H^H H C_j),$$
$$C_j \in C\} \quad \text{Equation 51}$$

For comparison purposes, described below are multiple scenarios, a first scenario with perfect CSI and a second scenario with the quantized CSI, where the first/second scenario are provided for comparison with a particular embodiment that employs channel statistics in addition to the aforementioned quantized CSI.

Regarding the first scenario, the BS uses the pre-coding matrix W=V where the columns of V are the two dominant right singular vectors of H. Given y to be the received symbol vector after matched filtering, s to be the data symbol vector, and n to be the noise vector, the received symbol vector y may be obtained via Equation 52:

$$y = \frac{W^H H^H}{\|HW\|}(HWs+n) \triangleq Ts + \tilde{n} \quad \text{Equation 52}$$

The resulting average data rate (per stream) is denoted as $R^{CSI}$, which can be computed per Equation 53.

$$R^{CSI} = \left(\mathbb{E}\left[\log\left(1+\frac{PT_{11}^2}{\sigma^2+PT_{12}^2}\right)\right] + \mathbb{E}\left[\log\left(1+\frac{PT_{22}^2}{\sigma^2+PT_{21}^2}\right)\right]\right)/2 \quad \text{Equation 53}$$

Regarding the second scenario with quantized CSI, the BS uses the pre-coding matrix $W=C_{i^*}$. Further, the resulting average data rate (per stream) is denoted as $R^{quan.\ CSI}$, which can be computed per Equation 54.

$$R^{quan \cdot CSI} = \quad \text{Equation 54}$$
$$\left(\mathbb{E}\left[\log\left(1+\frac{PT_{11}^2}{\sigma^2+PT_{12}^2}\right)\right] + \mathbb{E}\left[\log\left(1+\frac{PT_{22}^2}{\sigma^2+PT_{21}^2}\right)\right]\right)/2$$

Turning now to the present embodiment involving quantized CSI and statistics, the BS uses the pre-coding matrix W=V where the columns of V are the two dominant eigenvectors of the matrix that can be obtained via Equation 55.

$$\mathbb{C}[H^H H | H \in A_{i^*}] \quad \text{Equation 55}$$

The resulting average data rate (per stream) is denoted as $R^{quan.\ CSI\ w/stat.}$, which can be computed per Equation 56.

$$R^{quan.\ CSI\ w/stat.} = \quad \text{Equation 56}$$
$$\left(\mathbb{E}\left[\log\left(1+\frac{PT_{11}^2}{\sigma^2+PT_{12}^2}\right)\right] + \mathbb{E}\left[\log\left(1+\frac{PT_{22}^2}{\sigma^2+PT_{21}^2}\right)\right]\right)/2$$

Figure 15A:
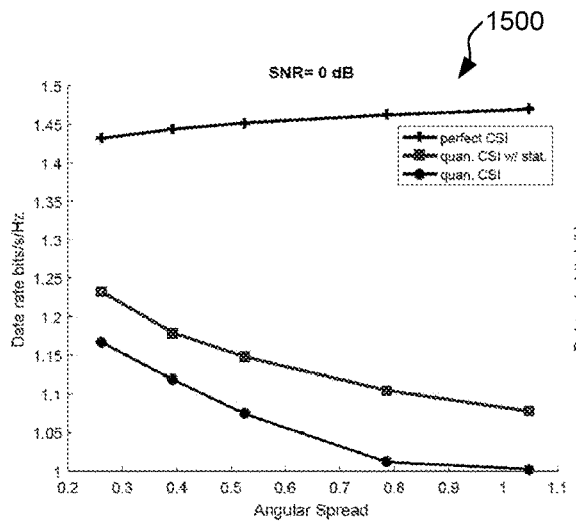
FIG. 15A illustrates a plot showing data rates as a function of angular speed for different pre-coding based on perfect/quantized CSI, for comparison with a single link embodiment (with a BS having M=4 antennas, the UE having N=2 antennas, and multiple layer receiver combining) employing pre-coding based on channel statistics in addition to quantized CSI, where such single link embodiment is for SNR=0 dB.
Figure 15B:
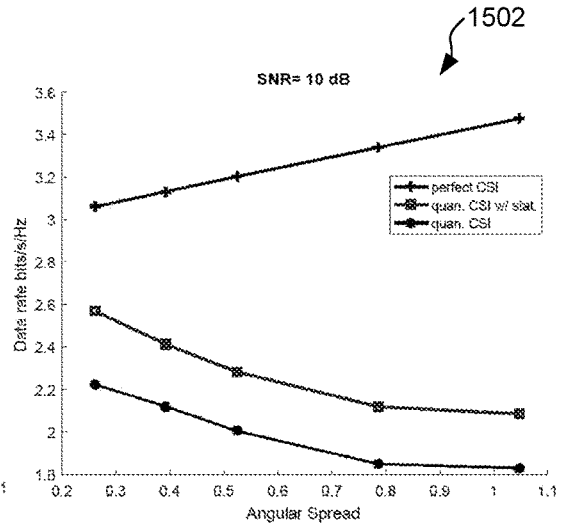
FIG. 15B illustrates a plot showing data rates as a function of angular speed for different pre-coding based on perfect/quantized CSI, for comparison with a single link embodiment (with a BS having M=4 antennas, the UE having N=2 antennas, and multiple layer receiver combining) employing pre-coding based on channel statistics in addition to quantized CSI, where such single link embodiment is for SNR=10 dB.
Figure 15C:
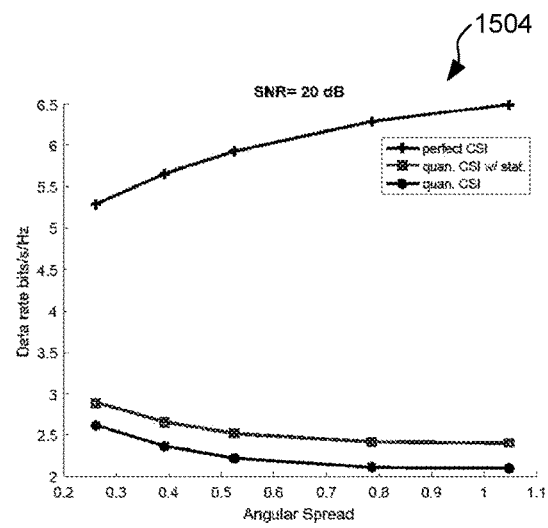
FIG. 15C illustrates a plot showing data rates as a function of angular speed for different pre-coding based on perfect/quantized CSI, for comparison with a single link embodiment (with a BS having M=4 antennas, the UE having N=2 antennas, and multiple layer receiver combining) employing pre-coding based on channel statistics in addition to quantized CSI, where such single link embodiment is for SNR=20 dB.

FIGS. 15A, 15B and 15C illustrate plots showing data rates as a function of angular speed for different pre-coding based on a perfect/quantized CSI, for comparison with single link embodiments (with a BS having M=4 antennas, the UE having N=2 antennas, and multiple layer receiver combining) employing pre-coding based on channel statistics in addition to quantized CSI, where such embodiments vary based on different signal to noise ratios (SNRs). Specifically, FIG. 15A illustrates a plot 1500 showing data rates as a function of angular speed for different pre-coding based on perfect/quantized CSI, for comparison with a single link embodiment (with a BS having M=4 antennas, the UE having N=2 antennas, and multiple layer receiver combining) employing pre-coding based on channel statistics in addition to quantized CSI, where such single link embodiment is for SNR=0 dB. Further, FIG. 15B illustrates a plot 1502 showing data rates as a function of angular speed for different pre-coding based on perfect/quantized CSI, for comparison with a single link embodiment (with a BS having M=4 antennas, the UE having N=2 antennas, and multiple layer receiver combining) employing pre-coding based on channel statistics in addition to quantized CSI, where such single link embodiment is for SNR=10 dB. Still yet, FIG. 15C illustrates a plot 1504 showing data rates as a function of angular speed for different pre-coding based on perfect/quantized CSI, for comparison with a single link embodiment (with a BS having M=4 antennas, the UE having N=2 antennas, and multiple layer receiver combining) employing pre-coding based on channel statistics in addition to quantized CSI, where such single link embodiment is for SNR=20 dB.

In use, a BS with M=4 antennas transmits two data streams (two layers) to a UE with N=2 antennas. The channel H is generated by using a one-ring scattering model with different values of the angular spread. The channels at the receiver side $h_1$ and $h_2$ are assumed to be independent. Further, the LTE 4Tx codebook (two layers) is used with a total of 16 codewords. In FIGS. 15A, 15B and 15, the achieved data rates (per stream) are compared in the following three scenarios: a perfect CSI scenario where the BS has the perfect CSI, a quantized CSI scenario where the BS has the quantized CSI, and a quantized CSI with channel statistics scenario where the BS has both the quantized CSI and the channel statistics. As shown, the knowledge of the channel statistics information may be beneficial to the system performance in all cases.

To this end, one or more features of the foregoing various embodiments may be employed in MIMO-equipped cellular systems. For example, multiple antennas, linear beamforming, and/or pre-coding may be employed for transmitting single or multiple data streams to improve the receive SNR and suppress interference. Linear pre-coding at the transmit side may employ the instantaneous downlink CSI. In FDD systems, the downlink CSI may be obtained through uplink feedback. Further, for LTE FDD, the implicit quantized CSI feedback may be adopted which may include PMI, RI, and/or the CQI, as mentioned earlier.

In systems with a large channel quantization error, performance degradation of the MIMO pre-coding may occur. As such, channel statistics may be utilized in addition to quantized CSI feedback to improve performance of the MIMO pre-coding. In one embodiment, the channel statistics may be available at the base station. Further, although uplink-downlink channel reciprocity may not be available for instantaneous CSI in FDD systems, the reciprocity may be exploited for the uplink-downlink channel statistics provided with downlink and uplink phase calibrations for the radio frequency (RF) chains at the base station.

With additional information on the statistical channel, the MIMO pre-coding performance may be improved for both single cell/user MIMO (SU-MIMO) performance (single-link) and multi-cell coordinated beamforming (multi-link) performance. In one embodiment, the performance enhancement may result by obtaining a conditional channel covariance matrix given the instantaneous CSI feedback and the transmit channel statistics. With such conditional channel covariance matrix, better beamforming vectors and/or pre-coding matrices for both single-link and multi-link transmissions may be obtained. As established above, numerical results validate the performance enhancements with the proposed pre-coding techniques.

Figure 16:
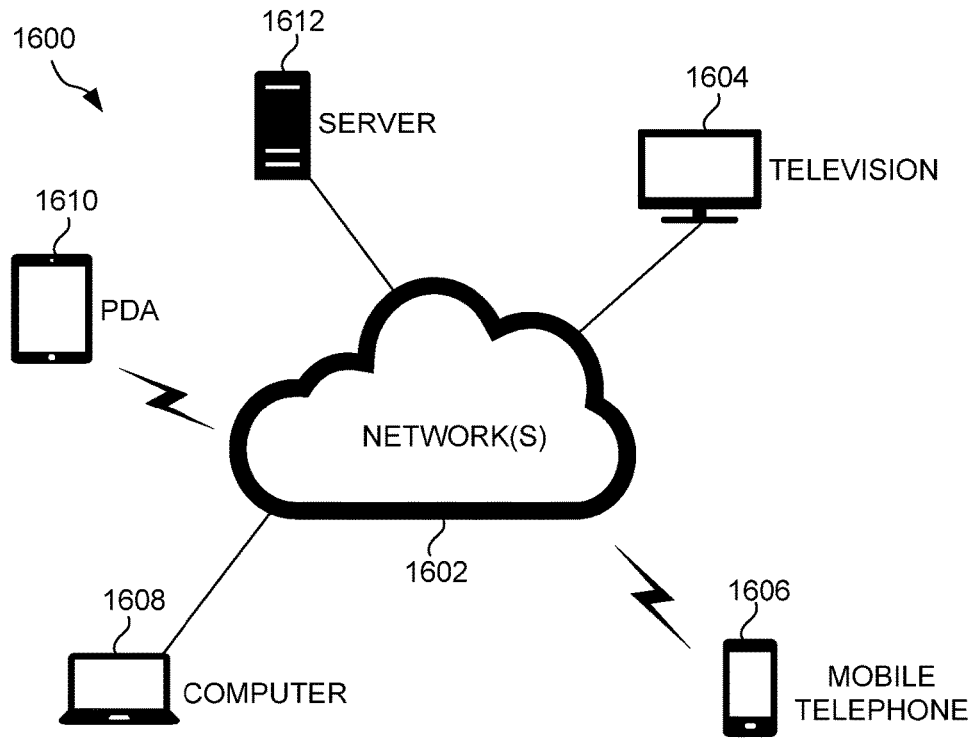
FIG. 16 is a diagram of a network architecture, in accordance with an embodiment.

FIG. 16 is a diagram of a network architecture 1600, in accordance with an embodiment. As shown, at least one network 1602 is provided. In various embodiments, any one or more components/features set forth during the description of any previous figure(s) may be implemented in connection with any one or more of the components of the at least one network 1602.

In the context of the present network architecture 1600, the network 1602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1602 may be provided.

Coupled to the network 1602 is a plurality of devices. For example, a data server computer 1612 and a computer 1608 may be coupled to the network 1602 for communication purposes. Such computer 1608 may include a desktop computer, lap-top computer, and/or any other type of logic. Still yet, various other devices may be coupled to the network 1602 including a personal digital assistant (PDA) device 1610, a mobile phone device 1606, a television 1604, etc.

Figure 17:
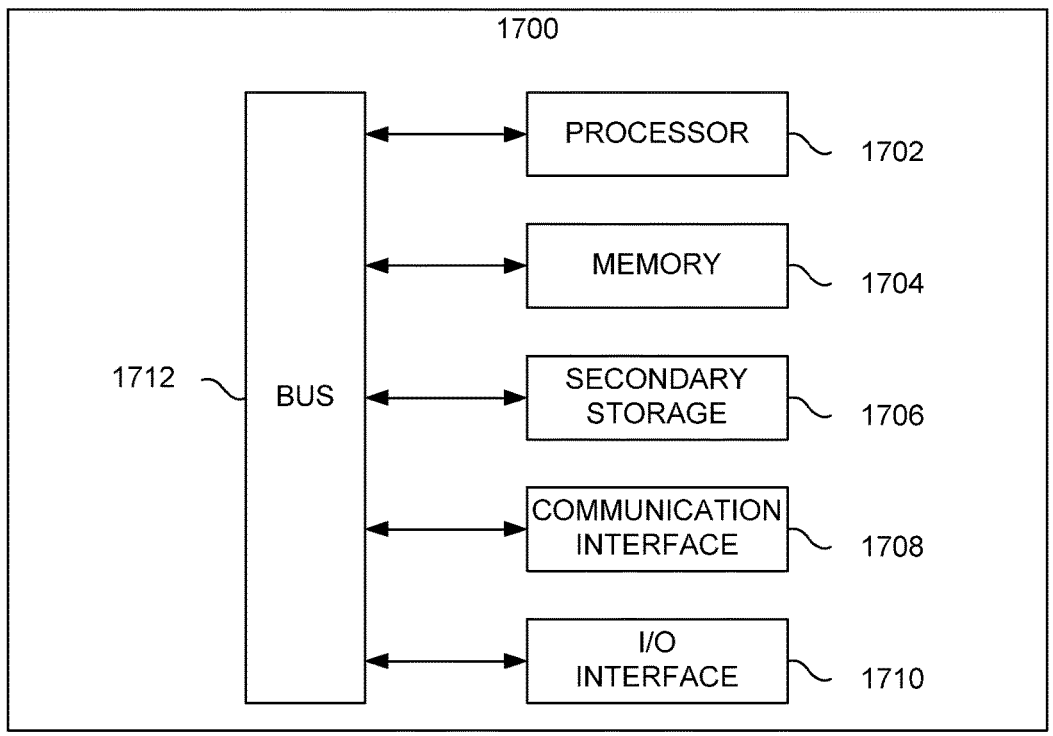
FIG. 17 is a diagram of an exemplary processing device, in accordance with an embodiment.

FIG. 17 is a diagram of an exemplary processing device 1700, in accordance with an embodiment. As an option, the processing device 1700 may be implemented in the context of any of the devices of the network architecture 1600 of FIG. 16. However, it is to be appreciated that the processing device 1700 may be implemented in any desired environment.

As shown, a processing device 1700 is provided including at least one processor 1702 which is connected to a bus 1712. The processing device 1700 also includes memory 1704 [e.g., hard disk drive, solid state drive, random access memory (RAM), etc.] coupled to the bus 1712. The memory 1704 may include one or more memory components, and may even include different types of memory. Further included is a communication interface 1708 (e.g. local/remote network interface, memory access interface, etc.) and an input/output (I/O) interface 1710 (e.g. display, speaker, microphone, touchscreen, touchpad, mouse interface, etc.).

The processing device 1700 may also include a secondary storage 1706. The secondary storage 1706 coupled to the bus 1712 and/or to other components of the processing device 1700. The secondary storage 1706 can include, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the memory 1704, the secondary storage 1706, and/or any other memory, for that matter. Such computer programs, when executed, enable the processing device 1700 to perform various functions (as set forth above, for example). Memory 1704, secondary storage 1706 and/or any other storage comprise non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), or the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; or the like.

It should be understood that the arrangement of components illustrated in the Figures described are exemplary and that other arrangements are possible. It should also be understood that the various system components defined by the claims, described below, and illustrated in the various block diagrams represent logical components in some systems configured according to the subject matter disclosed herein.

For example, one or more of these system components may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An apparatus, comprising:
   a non-transitory memory storing instructions;
   at least one wireless transceiver; and
   one or more processors in communication with the non-transitory memory and the at least one wireless transceiver, wherein the one or more processors execute the instructions to:
   collect channel statistics;
   send one or more reference signals to a wireless device via at least one channel;
   receive quantized channel state information corresponding to the at least one channel that is sent by the wireless device based on the one or more reference signals;
   generate a plurality of channel instances based on the channel statistics;
   identify, for each of the channel instances, the quantized channel state information via an index from a codebook including a plurality of pre-coding vectors;
   determine a decision region for each of the plurality of pre-coding vectors, in accordance with the index; and
   generate a conditional channel covariance matrix for each decision region;
   pre-code data in accordance with the conditional channel covariance matrix; and
   transmit the pre-coded data to the wireless device utilizing the at least one wireless transceiver.

2. The apparatus of claim 1, wherein the quantized channel state information includes an index i* that is calculated using the following equation:

$$i^* = \arg\max_{i:c_i \in C} |h^H c_i|$$

where i is an index, $c_i$ is a component of a codebook C, h is a complex column vector, and $^H$ denotes a Hermitian matrix.

3. The apparatus of claim 1, wherein the decision region $A_i$, i=1, |C| is determined using the following equation:

$$A_i \triangleq \{h \in \mathbb{C}^M : |h^H c_i| \geq |h^H c_j|, c_j \in C\}$$

where $c_i$ is a component of a codebook C, $\mathbb{C}^M$ is a complex vector of a size M, h is a complex column vector, and $^H$ denotes a Hermitian matrix.

4. The apparatus of claim 3, wherein the conditional channel covariance matrix is generated using the following equation:

$$\mathbb{E}[hh^h | h \in A_{i^*}] \approx \frac{1}{|A_i|} \sum_{h_n \in A_i} h_n h_n^H$$

where $h_n$ is channel instances, n=1, ..., $N_{samples}$.

5. The apparatus of claim 1, wherein the pre-coding includes setting a pre-coding vector to an eigenvector corresponding to a largest eigenvalue of the conditional channel covariance matrix.

6. The apparatus of claim 1, wherein the apparatus includes a first base station and the channel statistics include inter-cell channel statistics involving the first base station and a second base station.

7. The apparatus of claim 1, wherein the apparatus includes a first base station and the quantized channel state information includes inter-cell quantized channel state information involving the first base station and a second base station.

8. A method, comprising:
   collecting channel statistics;
   sending one or more reference signals to a wireless device via at least one channel;
   receiving quantized channel state information corresponding to the at least one channel that is sent by the wireless device based on the one or more reference signals;
   generating a plurality of channel instances based on the channel statistics;
   identifying, for each of the channel instances, the quantized channel state information via an index from a codebook including a plurality of pre-coding vectors;
   determining a decision region for each of the plurality of pre-coding vectors, in accordance with the index; and
   generating a conditional channel covariance matrix for each decision region;
   pre-coding data, in accordance with the conditional channel covariance matrix; and
   transmitting the pre-coded data to the wireless device.

9. The method of claim 8, wherein the quantized channel state information includes an index i* that is calculated using the following equation:

$$i^* = \arg\max_{i:c_i \in C} |h^H c_i|$$

where i is an index, $c_i$ is a component of a codebook C, h is a complex column vector, and $^H$ denotes a Hermitian matrix.

10. The method of claim 9, wherein the decision region $A_i$, i=1, ..., |C| is determined using the following equation:

$$A_i \triangleq \{h \in \mathbb{C}^M : |h^H c_i| \geq |h^H c_j|, c_j \in C\}$$

where $c_i$ is a component of a codebook C, $\mathbb{C}^M$ is a complex vector of a size M, h is a complex column vector, and $^H$ denotes a Hermitian matrix.

11. The method of claim 10, wherein the conditional channel covariance matrix is generated using the following equation:

$$\mathbb{E}[hh^h | h \in A_{i^*}] \approx \frac{1}{|A_i|} \sum_{h_n \in A_i} h_n h_n^H$$

where $h_n$ is channel instances, n=1, ..., $N_{samples}$.

12. The method of claim 8, wherein the pre-coding includes setting a pre-coding vector to an eigenvector corresponding to a largest eigenvalue of the conditional channel covariance matrix.

13. The method of claim 8, wherein the method is carried out utilizing a first base station and the channel statistics include inter-cell channel statistics involving the first base station and a second base station.

14. The method of claim 8, wherein the method is carried out utilizing a first base station and the quantized channel state information includes inter-cell quantized channel state information involving the first base station and a second base station.

15. A wireless device comprising:

a non-transitory memory storing instructions;

at least one antenna; and one or more processors in communication with the non-transitory memory and the at least one antenna, wherein the one or more processors execute the instructions to:

receive one or more reference signals via at least one channel, generate quantized channel state information corresponding to the at least one channel based on the one or more reference signals, send the quantized channel state information to a base station, and receive pre-coded data from the base station, wherein the pre-coded data is generated utilizing a conditional channel covariance matrix, and wherein the conditional channel covariance matrix is generated by:

generating a plurality of channel instances based on channel statistics;

identifying, for each of the channel instances, the quantized channel state information via an index from a codebook including a plurality of pre-coding vectors;

determining a decision region for each of the plurality of pre-coding vectors, utilizing the index; and generating a conditional channel covariance matrix for each decision region.

* * * * *